(12) United States Patent
Dane

(10) Patent No.: US 8,117,024 B2
(45) Date of Patent: Feb. 14, 2012

(54) SYSTEM AND METHOD FOR AUTOMATICALLY PROCESSING CANDIDATE RESUMES AND JOB SPECIFICATIONS EXPRESSED IN NATURAL LANGUAGE INTO A NORMALIZED FORM USING FREQUENCY ANALYSIS

(75) Inventor: Mark Dane, Sharon, MA (US)

(73) Assignee: My Perfect Gig, Inc., Lexington, MA (US)

( * ) Notice: Subject to any disclaimer, the term of this patent is extended or adjusted under 35 U.S.C. 154(b) by 213 days.

(21) Appl. No.: 12/113,763

(22) Filed: May 1, 2008

(65) Prior Publication Data

US 2009/0276209 A1 Nov. 5, 2009

(51) Int. Cl.
*G06F 17/27* (2006.01)
*G06Q 10/00* (2006.01)

(52) U.S. Cl. .......................... 704/9; 705/7.14
(58) Field of Classification Search .................. None
See application file for complete search history.

(56) References Cited

U.S. PATENT DOCUMENTS

| | | | | |
|---|---|---|---|---|
| 5,758,324 | A * | 5/1998 | Hartman et al. | 705/1 |
| 6,874,002 | B1 * | 3/2005 | Peleus et al. | 707/204 |
| 7,117,169 | B2 * | 10/2006 | Zara et al. | 705/28 |
| 7,555,441 | B2 * | 6/2009 | Crow et al. | 705/9 |
| 2002/0055870 | A1 * | 5/2002 | Thomas | 705/10 |
| 2002/0198766 | A1 * | 12/2002 | Magrino et al. | 705/11 |
| 2003/0229638 | A1 * | 12/2003 | Carpenter et al. | 707/10 |
| 2005/0080656 | A1 * | 4/2005 | Crow et al. | 705/8 |
| 2005/0080657 | A1 * | 4/2005 | Crow et al. | 705/8 |
| 2006/0017953 | A1 * | 1/2006 | Ly et al. | 358/1.13 |
| 2006/0085455 | A1 * | 4/2006 | Chmura et al. | 707/100 |
| 2006/0277465 | A1 * | 12/2006 | Pandit et al. | 715/531 |
| 2006/0287970 | A1 * | 12/2006 | Chess et al. | 707/1 |
| 2008/0065467 | A1 * | 3/2008 | Nyegaard | 705/10 |
| 2008/0071746 | A1 * | 3/2008 | Concordia et al. | 707/3 |
| 2008/0086366 | A1 * | 4/2008 | Concordia et al. | 705/11 |

\* cited by examiner

*Primary Examiner* — Mussa A Shaawat
(74) *Attorney, Agent, or Firm* — Wilmer Cutler Pickering Hale & Dorr LLP.

(57) ABSTRACT

Systems and methods for automatically processing candidate resumes and job specifications expressed in natural language into a normalized form using frequency analysis. A database of elements is provided in which each element is expressed in natural language and at least some of which are associated with a corresponding set of synonymous words or phrases. Candidate resumes and job specifications are received in electronic form and expressed in natural language. The candidate resumes and job specifications are analyzed to extract elements expressed in candidate resumes and job specifications. The extracted elements are compared to the database. For each extracted element, the most frequent element or synonym is identified an used as a common form for the extracted element. A set of candidate resumes is matched with a corresponding job specification by comparing the set of elements expressed in common form for the resumes with the set of elements expressed in common form for the job specification.

6 Claims, 25 Drawing Sheets

FIG: 16

| | 1602 | |
|---|---|---|
| No: | Element Variation | Count |
| 1603<br>1 | 1607<br>A/D Converter | 1611<br>1467 |
| 1604<br>2 | 1608<br>AD Converter | 1612<br>221 |
| 1605<br>3 | 1609<br>A to D Converter | 1613<br>9 |
| 1606<br>4 | 1610<br>Analog to Digital Converter | 1614<br>2 |

1601
1699 Files Processed

FIG. 24
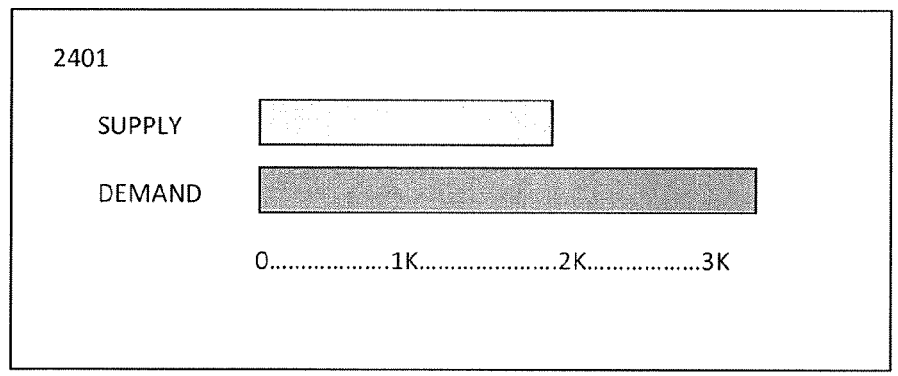
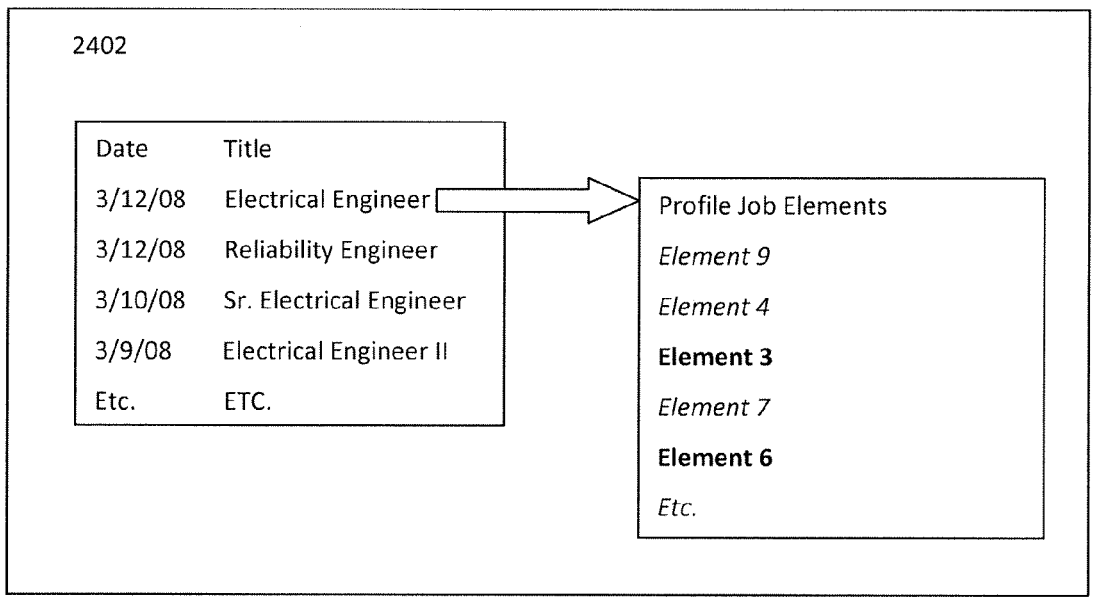

FIG: 25
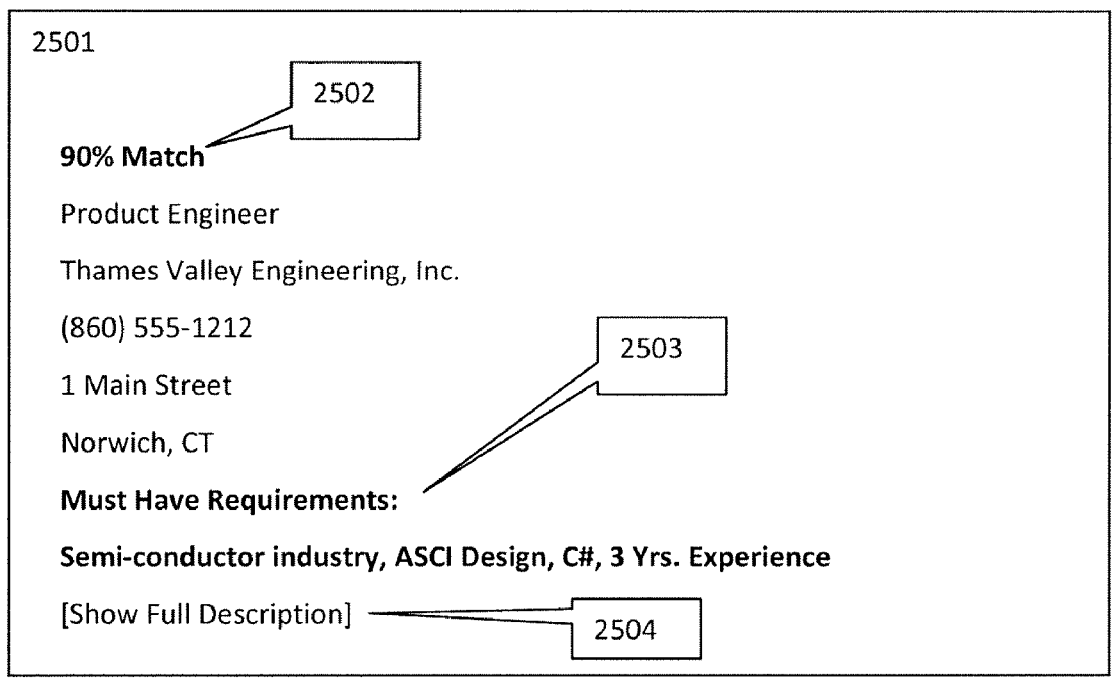
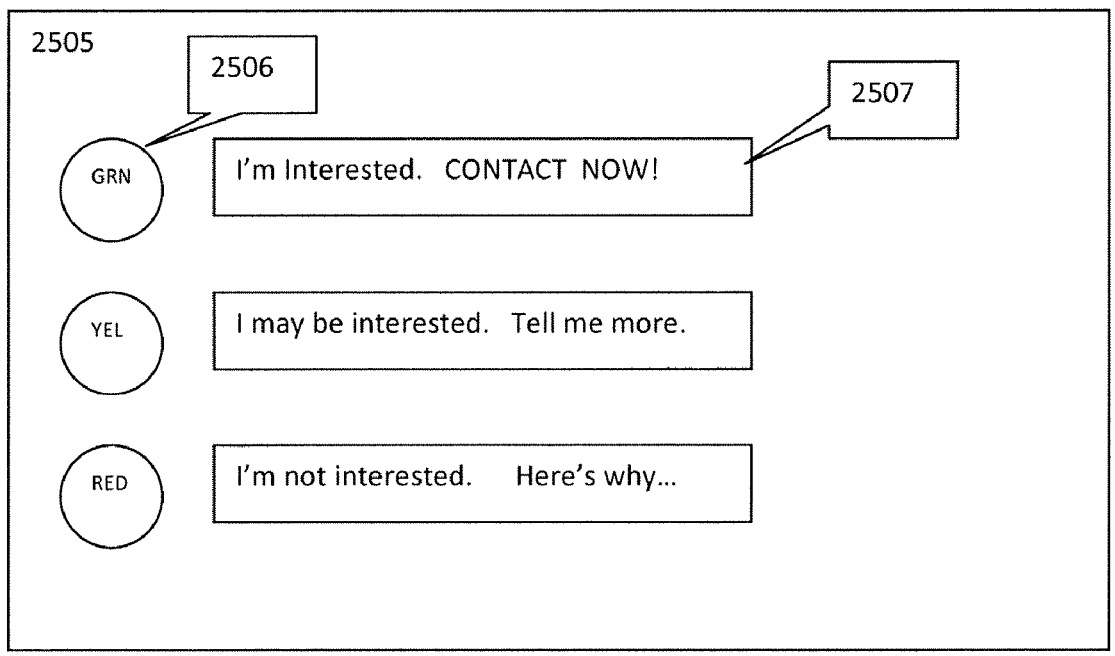

SYSTEM AND METHOD FOR AUTOMATICALLY PROCESSING CANDIDATE RESUMES AND JOB SPECIFICATIONS EXPRESSED IN NATURAL LANGUAGE INTO A NORMALIZED FORM USING FREQUENCY ANALYSIS

CROSS REFERENCE TO RELATED APPLICATIONS

This application is related to the following applications filed concurrently herewith, the entire contents of which are incorporated by reference:

U.S. patent application Ser. No. 12/113,748, entitled "A System and Method for Automatically Processing Candidate Resumes and Job Specifications Expressed in Natural Language by Automatically Adding Classification Tags to Improve Matching of Candidates to Job Specifications;"

U.S. patent application Ser. No. 12/113,757, entitled "A System and Method for Automatically Processing Candidate Resumes and Job Specifications Expressed in Natural Language into a Common, Normalized, Validated Form;"

U.S. patent application Ser. No. 12/113,769, entitled "A System and Method for Estimating Workforce Talent Supply;"

U.S. patent application Ser. No. 12/113,774, entitled "A System and Method for Modeling Workforce Talent Supply to Enable Dynamic Creation of Job Specifications in Response Thereto."

BACKGROUND

1. Field of the Invention

This invention is generally related to the field of electronic recruiting and candidate matching and, more specifically, to systems and methods for processing natural language expressions of job specifications and candidate resumes.

2. Description of the Prior Art

Finding the right person at the right time in the right location to fill an open position is a major challenge for most companies because the process of recruiting new employees is inefficient, time-consuming, and costly. The same is true from a candidates perspective as finding the right job at the right time is also a significant challenge for most candidates because the process of matching a candidate's unique set of skills is inefficient, time consuming and costly. The proliferation of web-based technology for recruiting and matching has expanded employers' and job seekers' ability to find each other, but it has made the process of recruiting and matching increasingly complicated. Companies focus on recruiting people to fill positions, but they do not know whether the people they need exist in the locale where they are trying to hire. Job seekers focus on finding the right position, but they don't have a complete understanding of which specific skills companies value most.

In recent years the number of technology companies attempting to solve issues in the recruiting process has grown tremendously. The proliferation of web-based technologies includes a wide range of applicant tracking systems, data extraction methods, new search technologies, and processes to match the appropriate job seekers with open positions. Applicant tracking systems collect job description and job seeker (resume) information, but they do not have precise matching between the required elements of the job specification and the skills and experience of the job seeker.

Data extraction methods are based on individual words which do not capture nuances in various types of skills and experiences. Extraction also relies upon large databases of verified data. Most extraction technology providers do not have adequate databases of verified data or high quality validation.

Existing search and matching technologies mostly rely on key words linked with Boolean operators to launch searches and retrieve search results, but using keyword based searches does not provide precise matching results. The key words can be taken out of context and result in poor search matches. For example, for the phrase "design simulation," existing technologies look for "design" and "simulation" as separate results and bring back results that are not relevant to the whole phrase "design simulation."

There are a number of recruitment industry technology companies attempting to automate the matching process. Their technology, generally known as an applicant tracking system (ATS), also uses key word searching with Boolean operators to execute their matching process. ATS providers include Kenexa, Kronos, and Vurv among others.

Online job boards all provide search capabilities to perform matching, but they are also using key words with Boolean operators which result in imprecise matches. There are hundreds of online job boards, but some of the more well-known boards include Monster, CareerBuilder, TheLadders, and DICE.

SUMMARY OF THE INVENTION

The invention provides systems and methods for automatically processing candidate resumes and job specifications expressed in natural language into a normalized form using frequency analysis.

Under one aspect of the invention, candidate resumes and job specifications are processed to match candidates with job specifications. A database of elements is provided in which each element is expressed in natural language and at least some of which are associated with a corresponding set of synonymous words or phrases. The elements and the synonymous words or phrases each have a corresponding usage counter. Candidate resumes and job specifications are received in electronic form and expressed in natural language. The natural language expression of the candidate resumes and job specifications are analyzed to extract elements expressed in candidate resumes and job specifications. The extracted elements are compared to the database and the usage counter corresponding to the extracted elements are updated. For each extracted element, the extracted element or the corresponding set of synonymous words or phrases that has the highest usage is determined and it is used as a common form for the extracted element. A set of candidate resumes is matched with a corresponding job specification by comparing the set of elements expressed in common form for the resumes with the set of elements expressed in common form for the job specification.

BRIEF DESCRIPTION OF THE DRAWINGS

In the drawing,

FIG. 16 depicts a sample frequency count table utilized for comparing element variations as part of the normalization process.

FIG. 24 shows additional aspects of the user interface.

FIG. 25 shows additional aspects of the user interface.

DETAILED DESCRIPTION OF PREFERRED EMBODIMENTS

Overview

Figure 1:
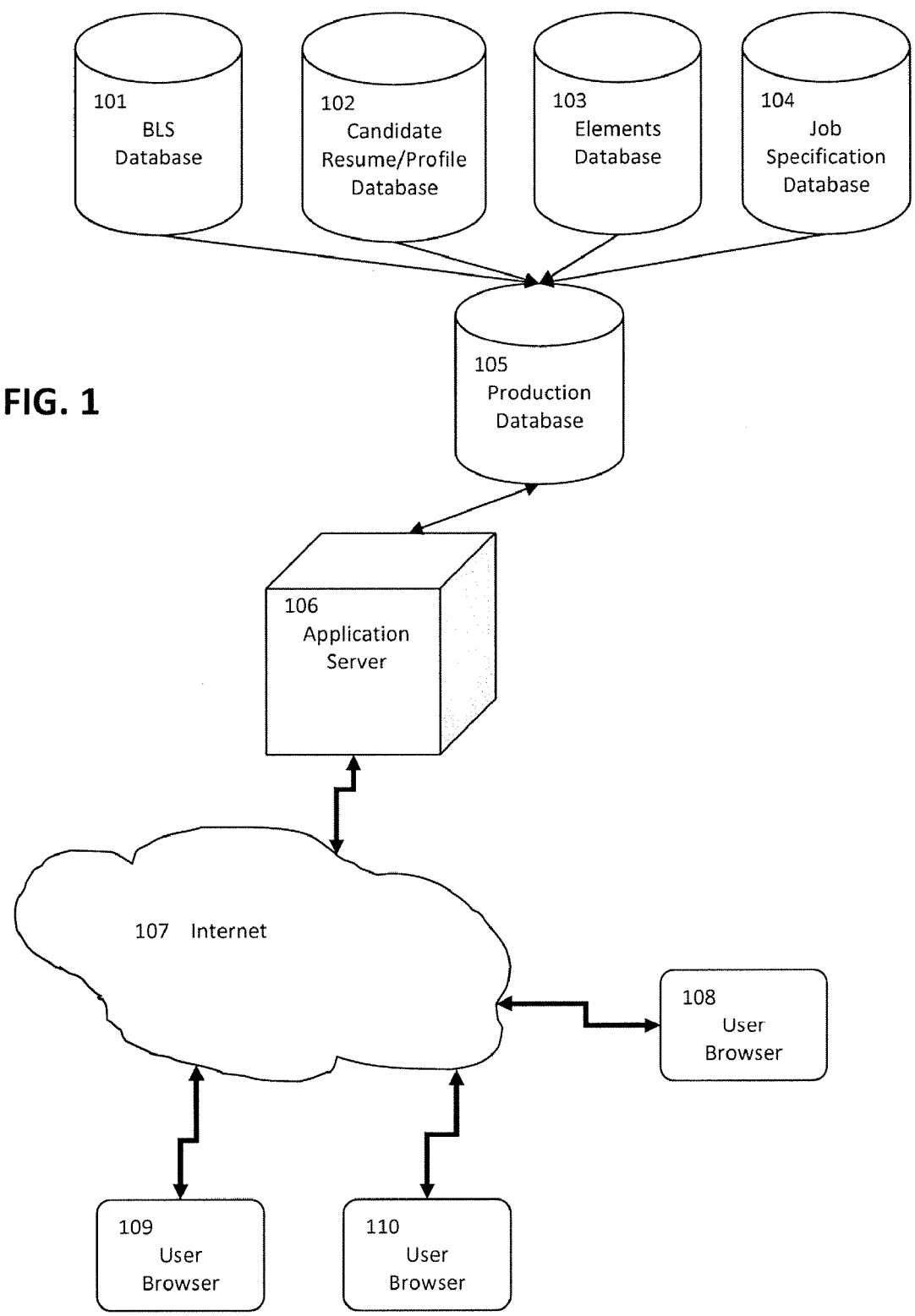
FIG. 1 is a high level reference architecture diagram for certain embodiments of the invention.

Preferred embodiments of the invention take two disparate and, for the most part unstructured, types of natural language document files (job specifications and candidate resumes) and distill and identify the essential job elements contained in this files. "Job elements" are the words or phrases that are believed to be meaningful for matching candidates with job specs. Using frequency analysis methods, preferred embodiments normalize these distilled elements to create a knowledge base of most frequently used element terms and their related synonyms. The preferred embodiments use these normalized element terms to compare job specification requirements to candidate skills and experiences. The normalized element terms are unobtrusively substituted for the actual terms used in the job specification and candidate resume/profile. Because this substitution takes place unobtrusively as a background process, neither the creator of the job specification nor the creator of the candidate resume/profile needs to be forced to re-write their respective documents or fill-out a pre-defined form that forces normalization of terms though the use of pre-formatted drop-down lists. Instead, they may draft these documents as they normally would using natural language.

The preferred embodiments provide workforce talent supply data for each of the element terms by sampling a very large database of candidates resumes/profiles and applying the sampling results to U.S. Bureau of Labors statistics (BLS) occupational employment data. The use of normalized element terms makes possible comparing element requirements from the job specification to the candidate resume/profile elements found in the candidate database. Using the preferred embodiments the creator of the job specification can model the impact of adding or removing elements as "must have" requirements from the specification and settle on the best combination of "must have" requirements that will result in the largest, or most appropriately-sized, relevant talent pool.

Along with workforce talent supply data by element, the preferred embodiments also provide a snapshot of demand by element for a selected point of time. The preferred embodiments do this by displaying the job specifications for all other organizations seeking the same elements at the time the invention was last updated.

The preferred embodiments may then become a tool to help the job specification creator improve and optimize the job specification by selecting the more commonly used job element terms. The more commonly used terms that candidates actually use to describe themselves will interest a larger pool of applicants and draw more candidate submissions to the job specification. A larger selection pool will typically decrease the time to hire and improve the probability of a high quality match.

Using these normalized element terms as a common language, the preferred embodiments compare job specifications with candidate resumes/profiles and provide a match of very high accuracy if a job candidate with the required "must have" elements exists in the candidate database. Unlike the more common keyword searching with Boolean operators, the matching capability of the preferred embodiments, based on the common language of normalized elements, does not require a user to guess at the appropriate term or be an expert in Boolean searching.

Job specification creators, typically either corporate recruiters or hiring managers, may use the system as authorized Internet Users. The preferred embodiments can either automatically retrieve or copy the appropriate job specifications from their public job site, or they can load a job specification file into the system, or they can create a job specification using the system and selecting requirements from the elements database.

Candidate resumes/profiles are submitted to the system directly by the candidates. Candidates are also authorized Internet Users of the invention. Candidates can view the same workforce talent supply data and demand data by element, and view the "must have" elements specified by job specification creators.

At present, companies and job seekers do not share a common language to describe job requirements, skills and experience, making it difficult to produce a meaningful job specification that will attract the most qualified talent pool. The lack of a common language and the failure to understand the local talent market supply and demand make the recruiting and candidate matching process ineffective, wasting a lot of time and money on low quality recruitment results.

The first obstacle in the recruiting process is defining a job description (job specification) detailing the responsibilities of the position as well as the skills and experience required to perform the job function. There are no standards for writing a clear, effective job description. While some large companies may have templates for different categories of job specifications, hiring managers usually develop the content for their own job descriptions. In larger companies an internal recruiter may help the hiring manager create the job specification. In either case, they often create lengthy descriptions with an extensive list of required skills and experience for the idealized candidate. The resulting job specifications are unstructured and often contain an unattainable mix of job requirements.

The next potential roadblock in the existing recruiting process is the lack of a common language to describe job skills and experience. There are endless variations of words and phrases to describe basic job experiences, skills and titles. Employers and job seekers usually find each other using a key word search on the internet, but variations in words and phrases complicate the search process. For example, variations describing a Bachelor of Science degree, variations can include BS, bachelor, or bachelors. When a company is searching for job seekers with a Bachelor of Science degree if they enter "Bachelor of Science" in a key word search, their results will not include any job seeker who used BS, bachelor or bachelors on their resume.

The third major problem in recruiting is the lack of data in the process of defining a recruiting strategy for a specific position. Historically, hiring managers and recruiters have used past experience and a lot of guesswork in the recruiting process, with no in-depth knowledge about the skills and experience of the available talent pool.

Preferred embodiments address these shortcoming by using the US Bureau of Labor Statistics and other data, sampling algorithms, a common language for matching, and large sample bases to derive the locale-based labor market supply and demand analytics to drive intelligent sourcing of specific talent pools.

Preferred embodiments of the invention provides systems and methods to calculate workforce talent supply and demand data, and integrate the same into the recruitment and candidate matching process through a modeling interface, and to develop a common language to more accurately match job requirements to candidate's skills through the use of normalized data. Short phrases that describe job experiences and skills are identified and extracted from the job specification and candidate resumes or profiles to form job "elements." Job specifications and candidate resumes or profiles are extracted using the same methodology, but they are on separate processing paths and reside in separate databases. Extracted job elements are filtered and categorized according to type of job skill or experience. These categories include responsibility, experience or skills, products used, tools used, industries, education level attained, role or job title, willingness to travel, and security clearance. The extracted job elements are validated against the existing data base of job elements using a predetermined set of rules. Newly discovered job element phrases are added to the database. Extracted job elements are normalized to the highest frequency occurrence of all of the variations describing the same job element. Each job element and all of its variations are associated, or linked, with each other in the knowledge base creating synonyms for the normalized standard value for the element.

Bureau of Labor Statistics occupation and industry data is applied in combination with results from a sampling data base to calculate or infer the supply of labor talent that meets the specified skills and experience requirements of a job specification for a specified locale. Job specifications and candidate resumes/profiles may be classified and tagged with job elements to identify the industry using NAICS codes(s), occupational level, occupational area, and years of experience. Each job specification and candidate resume/profile may be also associated with an US BLS occupation code(s)/title(s) and geography.

Under some embodiments, the talent supply may be displayed, numerically and graphically, simultaneously with the list of required job elements for the specification and regenerates dynamically as required job elements are moved out of the "required or must have" category and into the "desired" category, modeling the talent supply impact of job element tradeoffs. The current demand for the same talent pool required in the specification in the same locale may be generated, showing the companies in the same industry who are currently seeking people with the same job skills.

Recommendations may be generated to increase the talent supply for the particular job specification. This is more fully described in paragraph 0155 and as shown in element 2208. A candidate is able to access similar supply (Element 2304) and demand (Element 2401) data based on an analysis of their skills. A candidate is able to view job specifications that most closely match their skills as shown in element 2501. A candidate is able to request that a company representative contact them regarding a particular open job requisition as shown in element 2507.

FIG. 1 is a high level architecture diagram for the main physical components that comprise preferred embodiments of the invention and also depicts the exchange of data between components. Preferred embodiments of the invention are implemented as Software as a Service (SaaS) application that is accessed by a user from the internet. The key systems and methods that comprise the invention are used to process and distill data that is stored in the databases shown in FIG. 1.

Database 101 is a commercially available conventional database used to hold Bureau of Labor Statistics (BLS) Data that has been processed by preferred embodiments of the invention. This database contains employment count information cross-indexed by occupation, industry, and geography. Geographic employment counts are available for the US in total and for each state. In some states, employment counts are also available for metropolitan statistical areas. The processing of data from BLS is described in more detail below in connection with FIG. 21.

Database 102 is a commercially available conventional database used to hold both processed candidate resume/profile data and the original file submission. This database contains candidate resumes/profiles that have been normalized by job title, and classified by occupation, industry, functional area, job level, and years of work experience. The classification process is more fully described in FIG. 20. This data base also contains extracted data such as contact information, most recent employers, most recent job titles, schools attended, degrees received, year graduated, and first year of employment. Data extraction is processed using commercially available resume extraction products such as Resume Mirror.

Database 103 is a commercially available conventional database used to hold "job elements" that have been distilled out of candidate resumes/profiles and job specifications. The process for distilling out job elements from job specifications is more fully described in FIG. 4. The process for distilling out job elements from candidate resumes/profiles is more fully described in FIG. 11. Some of the processes and systems used are the same for processing job specifications and/or candidate resumes/profiles. Those that are the same for both types of data are so noted.

Database 104 is a commercially available conventional database used to hold both processed job specifications and the original file submission. This database contains job specifications that have been normalized by job title and classified by occupation, industry, functional area, job level, and years of experienced required. The classification process is more fully described in FIG. 19.

Database 105 is a commercially available conventional production database used to hold all the data used by the user interface and web server application to display results to users. This data may be a snapshot of information contained in databases 101-104.

Application server 106 is used to process user browser data requests and return back the data requested. The web services software and hardware that comprise the application server are commercially available conventional products.

As mentioned above, preferred embodiments of the invention are implemented as software as a service (SaaS) product and is accessed by users via the internet 107. Each user has a unique UserID and password which must be successfully entered in order to use the system.

Users/browsers 108, 109 and 110 are conventional.

Users, such as corporate recruiters, submit job specifications either directly to the system (more below) or the system automatically obtains job specs by analyzing corporate websites of the recruiter and automatically copying information into the system. Users such as job seekers are invited to submit their resumes electronically. These electronic files are then processed (more below) to populate the relevant job specification and candidate databases. The job specifications may then be compared to the candidate information to provide a list of candidates that may qualify as candidates for the specification.

BLS Database 101 includes information from the official BLS database to include workforce employment populations organized or indexed by occupational codes and industry code for all 50 states and in some cases additional metropolitan statistical areas (MLAs). The official BLS database is further processed to infer missing data using statistical information. For example some states might not provide to BLS the employment population for a specific occupation or industry. So in a case like this, the population would be inferred using statistical techniques. Corporate recruiters may use database 101 to model the population of a relevant workforce (as further described below) to determine how a job spec will match to the candidate pools and to model how changing the specification may alter the number of matches. Candidates may also use the web infrastructure to view the workforce talent supply and demand data and to view the job specifications.

Figure 2:
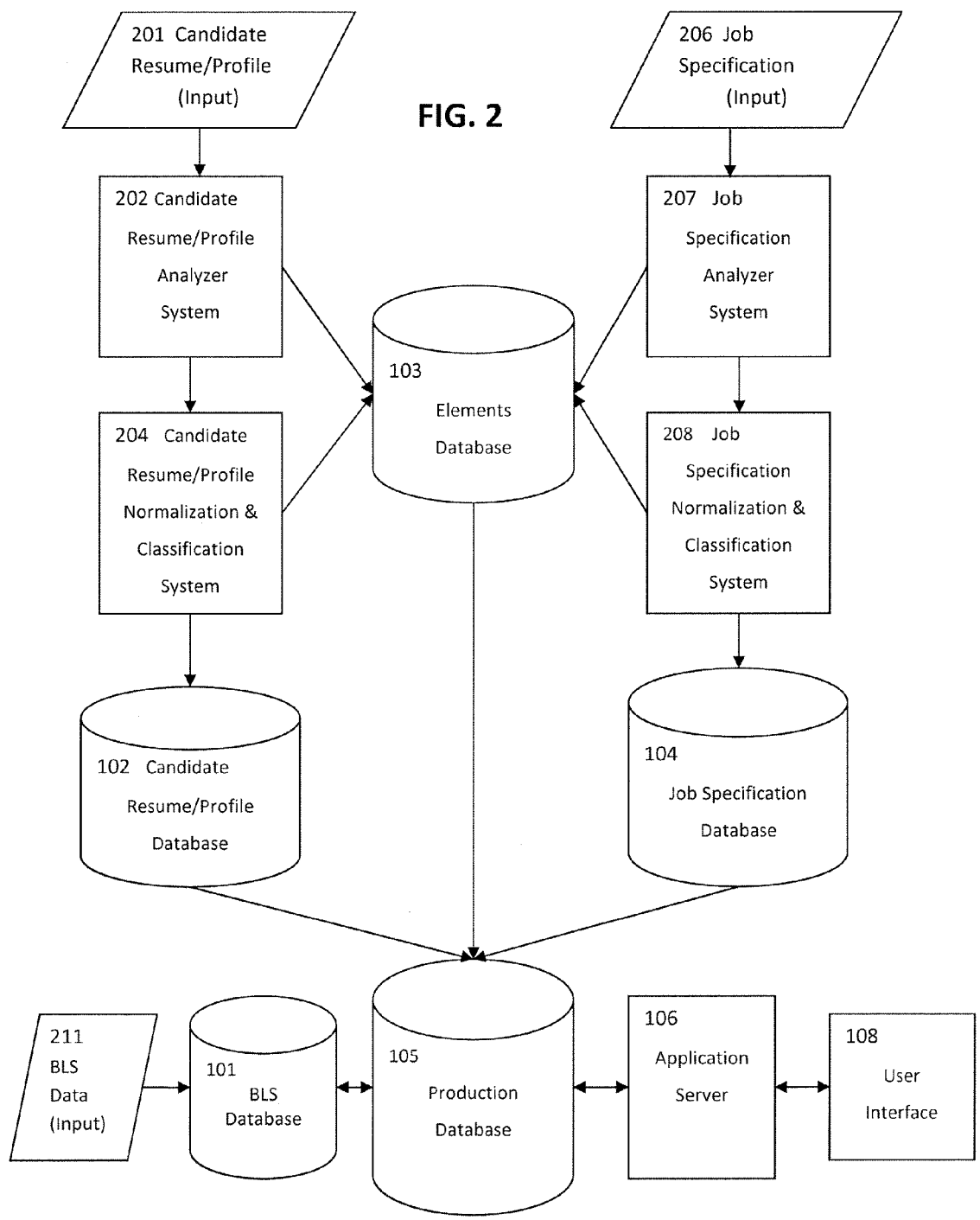
FIG. 2 is a data flow diagram for certain embodiments of the invention.

FIG. 2 is a data flow diagram depicting how resumes and job specifications are processed to populate the various databases described in connection with FIG. 1. The system processes and distills three primary types of data. One data category is candidate data. Candidate data is typically input into the invention in the form of an electronic resume or profile file 201. A second category of data is a job specification. Job specification data is also commonly referred to as a job description. Job specifications are also input into the system in the form of electronic files 206. The third category of data that is input into the invention is U.S. Bureau of Labor Statistics data 211. This is workforce census data collected and aggregated by the Bureau of Labor Statistics. The BLS state data is provided in a variety of file formats. The workforce census data used by the system is cross-referenced by U.S. occupation code and industry code.

Job specs 206 are provided to a job specification analyzer system 207. This logic is described in more detail below in connection with FIG. 4, among others. The job specification analysis system 207 distills the job specification into what are perceived to be relevant elements. At this stage, the relevant elements are still expressed in the natural language used by the author of the job specification. The job specification analyzer system 207 updates elements database 103, for example, storing the elements it has detected and updating the tally for such elements accordingly (more below). The logic 207 is responsible for determining which elements are meaningful for further processing of the specification, and which may be effectively ignored. For example, the job specification may include some form of address information on how to apply for a job (e.g., physical or electronic address). This information is likely irrelevant for matching candidates to the specification and may be ignored for further processing.

The job specification analyzer system 207 provides the distilled elements to job specification normalization and classification system 208. This logic is described in more detail below in connection with FIG. 19, among others. The job specification normalization and classification system 208 works in conjunction with the elements database 103 to translate or transform the job specification being analyzed into normalized elements. As is described in more detail below, preferred embodiments use the most frequent term among a set of perceived synonyms to act as the normalized element term for further processing, e.g., matching to candidates. So if the job specification used the natural language term "BS" and the elements database 103 recognizes that this is a synonym for "bachelor of science" and if "bachelor of science" were more frequently used by the universe of users of the system, the logic 208 would transform the spec's use of "BS" into "bachelor of science" (it would also increase the tally count for BS). The logic 208 would also pass classification data to the job specification to improve matching, e.g., adding industry codes and the like as described in more detail below. At this stage, the relevant elements are still expressed in the natural language but the natural language elements are normalized to the most frequently used terms by the universe population of actual creators of job specifications and creators of candidate resumes/profiles.

The job specification normalization and classification system 208 then updates job specification database 104. A job specification identifier (ID) is associated with the job specification being analyzed. The original (or "raw") specification is stored, and the normalized expression is stored. More specifically, the normalized expression may constitute a set of element identifiers, each of which is associated with one of the identifiers stored in elements database 103.

The process just described may remain in constant processing and periodically provide snapshots of the job specification database to the production database 105. From there the data may be viewed via the web infrastructure 106, 108 described above.

Candidate resumes 201 are processed in a largely analogous manner. Candidate resume analyzer logic 202 operates akin to logic 207 but is tuned for candidate resumes as opposed to job specifications. Its logic is described in more detail in connection with FIG. 11, among others. Candidate resume normalization and classification logic 204 operates akin to logic 208. Its logic is described in more detail in connection with FIG. 18 among others.

Figure 3:
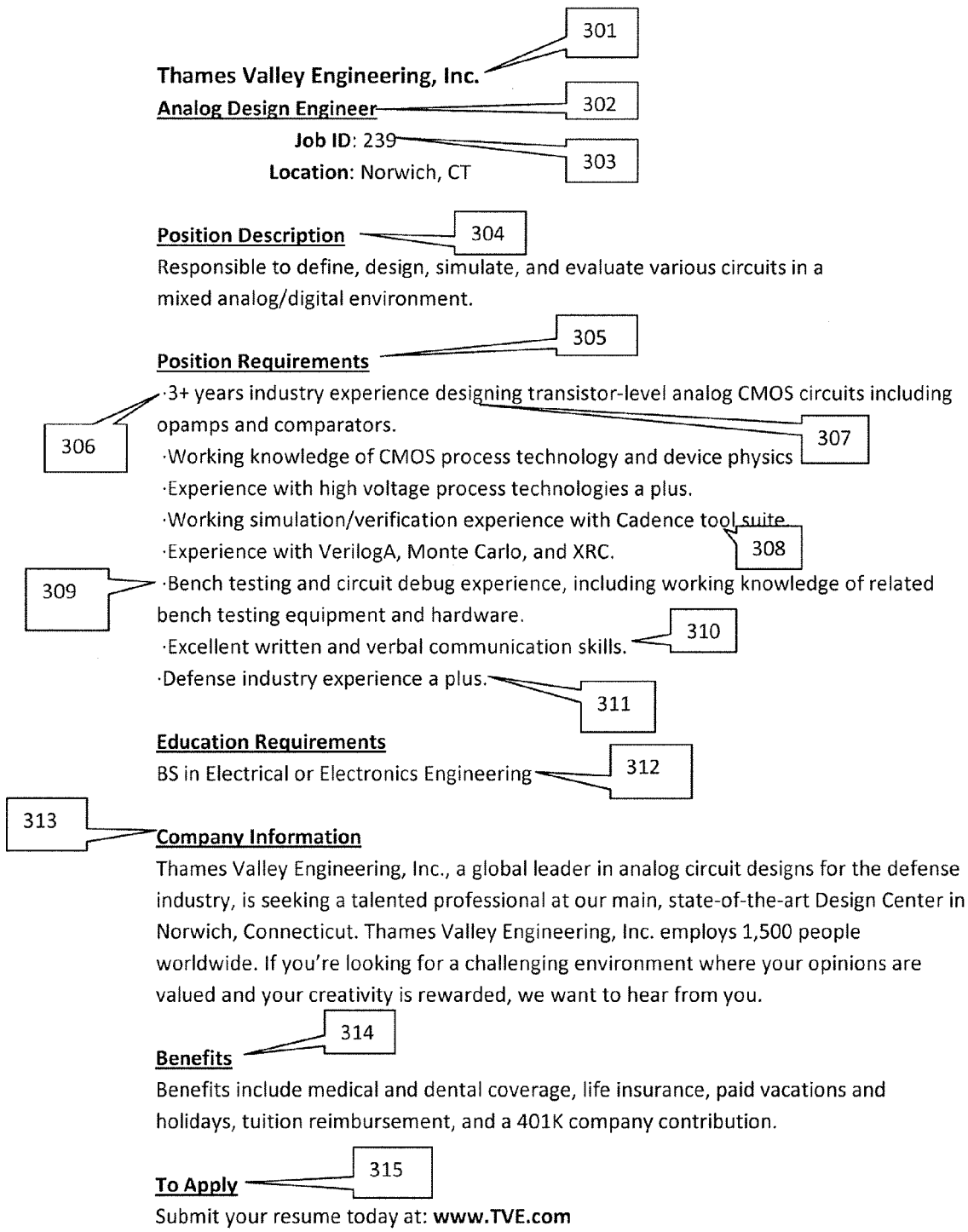
FIG. 3 shows a sample (fictitious) job description (also called a job specification or job spec) which may be processed by certain embodiments of the invention.

FIG. 3 depicts a sample of some of the job characteristics contained in a typical job description 206. Item 301 is the name of the company. The name of the company is used to determine the industry classification for the company (more below in connection with FIG. 19, specifically item 1910). The industry code for the company is obtained from the North American Industry Classification System (NAICS) and is typically referred to as the NACIS code for the company. A company may have more than one NAICS code if its business spans more than one industry.

Item 302 is the job title or position title for the job described below. This would be the external job title that the company uses for public display and may differ from an internal job title used for payroll purposes.

Item 303 is the job ID for this job description. This identifier might be called a job requisition number or a job description number at another company. This identifier is typically numeric, but it might also be alpha-numeric. The system retains this identifier in its original form to assist a user in looking up a specific job description (more below in connection with FIG. 22, specifically item 2202).

Item 304 is the position description or a high level description of what the person in this position will do or be responsible for at this company. Job elements may or may not be found in this section of the job description. The position description is data that is processed by the Job Specification Analyzer System 207.

Item 305 is the actual requirements for the position. This is typically a listing of past work experiences, skills learned, and tools used and mastered in another work experience. This is what the company wants the candidate to have to be considered for employment in this position. Job elements are usually found in quantity in this section of the job description. Position requirements are data that is processed by the Job Specification Analyzer System 207.

Item 306 is the number of years of work experience the employer expects the candidate for the position to have accumulated. This data is used by the system to classify the years of experience required for this job specification (more below in connection with FIG. 19, specifically item 1913).

Item 307 is a word ("designing") used to describe the type of experience the candidate for the position should have. Words like "designing," "building," "testing," "installing," "repairing," etc. are important because they help describe the specific type of experience being sought. These words become job elements used by the system and preferably is distilled out of the job specification file 206.

Item 308 identifies a set of tools that the candidate should have experience and skill with to be considered for this position. Words that describe tools a person would use to complete a task (MS-Word, C++, electron micro-scope, calipers, VerilogA, etc.) become job elements used by the system and need to be distilled out of the job specification file 206.

Item 309 shows a sentence that describes a type of work experience being sought. The words and phrases "bench testing," "circuit debug," "bench testing equipment" and "bench testing hardware" would all become un-normalized job elements and preferably is distilled out of the job specification file 206.

Item 310 points to a sentence that describes another set of candidate skills being sought. Written and verbal communication skills are often referred to as soft skills. The words and phrases "written communication" and "verbal communication" would also be considered job elements by the system and preferably are distilled out of the job specification 206.

Item 311 describes another type of candidate experience being sought. This is not a "must have" experience but a less critical experience. The words defense industry would be considered a job element in the system and need to be distilled out of the job specification.

Figure 5:
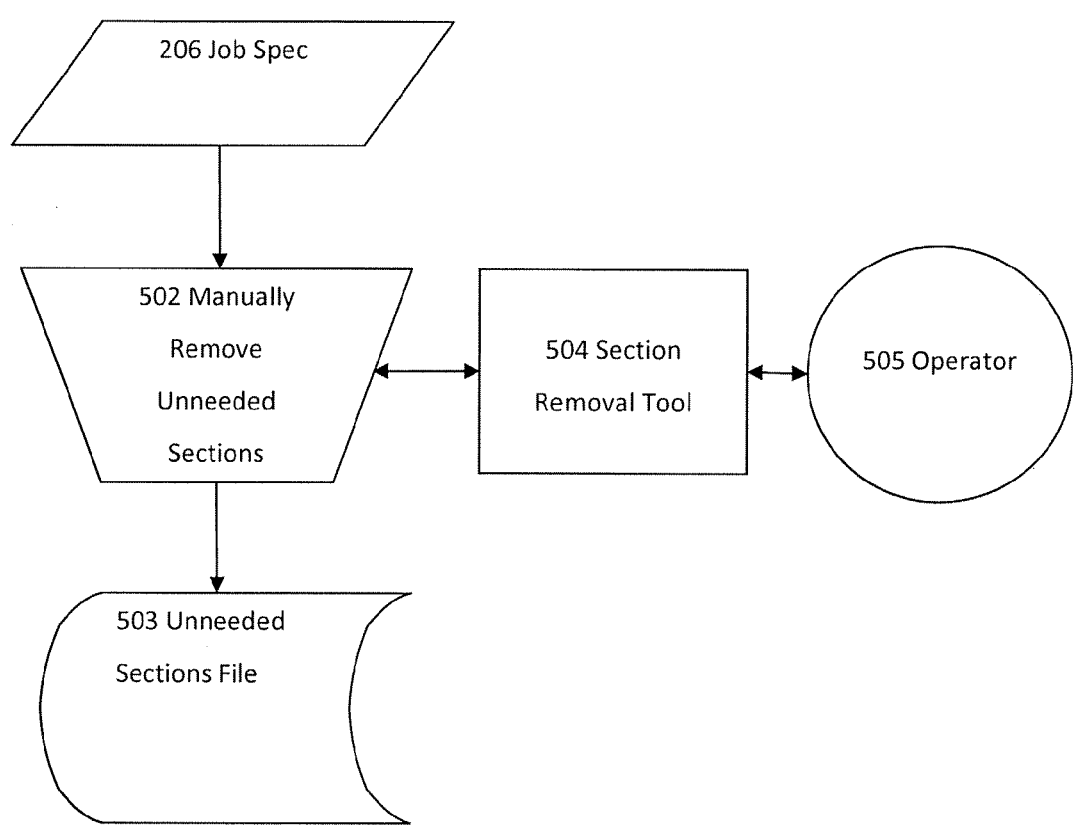
FIG. 5 is a flow chart depicting a portion of the system for analyzing job specifications, including showing portions which involve operator-directed, manual processes of removing or eliminating unneeded sections of the job description.

Item 313 points out a section of the job description that provides the candidate with information about the company. The system preferably ignores this section for further processing. This section does not contain any job elements and would slow down the processing of the file. This section is removed from the working file during the process described in FIG. 5.

Item 314 identifies a section of the job description that provides the candidate with information about benefits available to employees of the company. This section does not contain any job elements and would slow down the processing of the file. This section is removed from the working file during the process described in FIG. 5.

Item 315 identifies a section of the job description that provides the candidate with information regarding applying for the position. This section does not contain any job elements and would slow down the processing of the file. This section is removed from the working file during the process described in FIG. 5.

Figure 4:
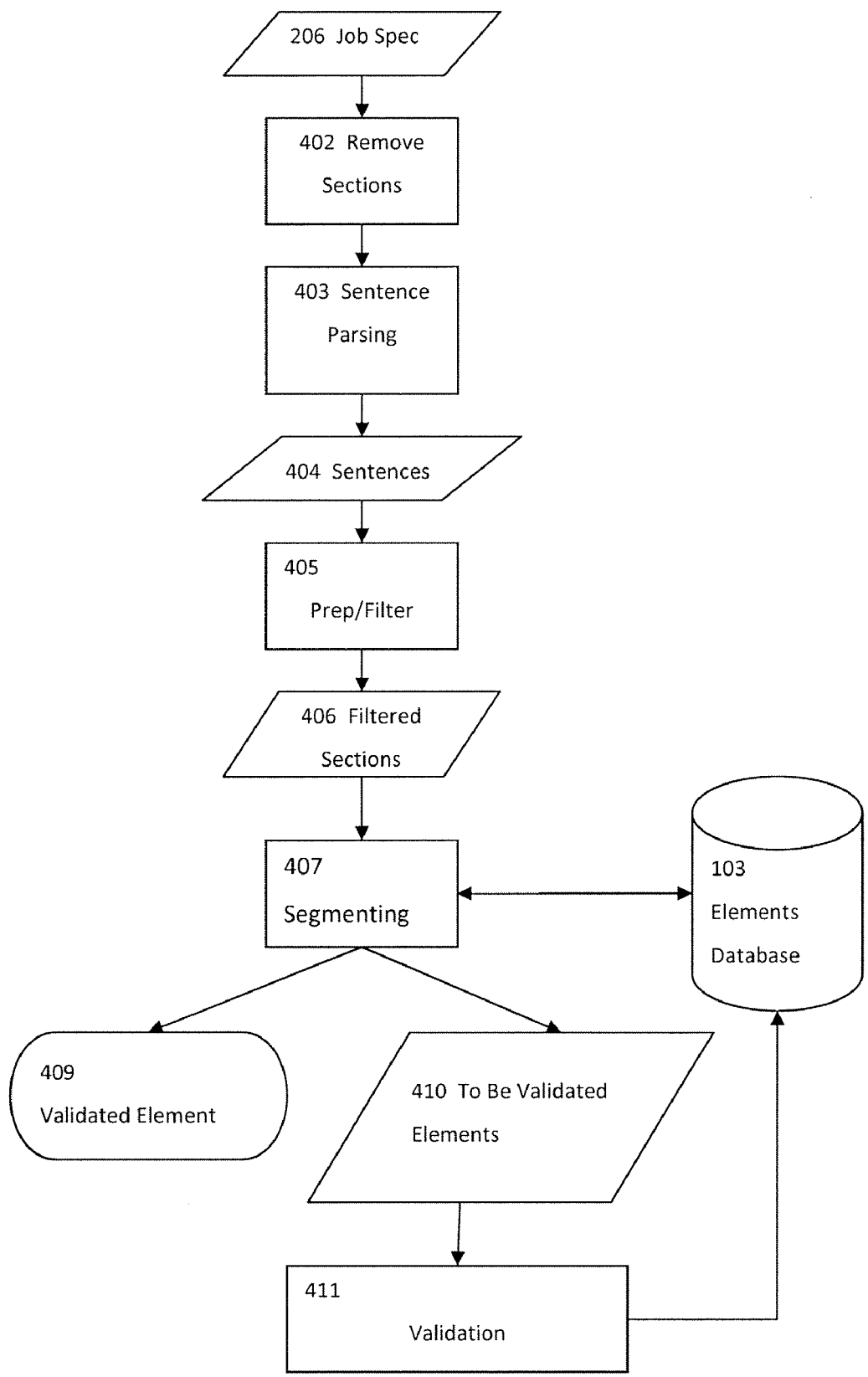
FIG. 4 is the process flow for analyzing job specifications according to certain embodiments of the invention.

FIG. 4 is a flow chart of the logic for the job specification analyzer system 207. The logic receives job spec 206 as input. The first step 402 is to remove unneeded sections from the job spec 206. Unneeded sections typically include Company Information FIG. 3 (313), Benefits Information (314), and How To Apply (315), among others, from the sample job spec in FIG. 3. The removal of unneeded sections is described in FIG. 5. The purpose in removing unneeded sections is to avoid this data in any follow on job specification processing steps.

The next step 403 identifies and parses out individual sentences from the job spec (206). This process is described in FIG. 7. The purpose in parsing out individual sentences is to facilitate logical processing in the follow on processing steps. Each sentence in natural language job specs (or resumes) typically contains a thought, usually a requirement or skill (or multiples) for success in the job. The system 207 separates out each of these requirements one sentence at a time to facilitate processing. The parsed sentences are output 404 for further processing.

The next step 405, Prep/Filter step, filters out various forms of special characters that might appear in the natural language expression of the job spec, but which are filtered out to facilitate further processing and reasoning about the job spec. This process is described in detail in FIG. 8. The filtered sentences are output 406 as filtered sections.

Step 407 receives the filtered sections and breaks them down to contain single unique topics. Thus sentences containing multiple topics (or potentially relevant elements) are broken down into multiple smaller pieces to facilitate subsequent processing. This process is described in FIG. 9. The Segmenting Engine (described in more detail below) does this task by comparing single words (typically nouns), and two and three word combinations (typically containing a noun and a verb), to elements database 103 of known topics or elements relevant to the occupation or industry under consideration. Topics found in the database 103 are validated elements 409 available for subsequent processing. Topics that are not found in the database 103 but from processing appear to be informational nouns or phrases that may be useful for subsequent processing (e.g., matching) are output as topics 410 to be validated.

In step 411, the to be validated topics 410 are validated. This process is described in detail in FIG. 10. In short, human operators analyze these topics 410 to determine their legitimacy as elements for processing. If they are validated, they are entered in the elements database 103 (with the tally count updated accordingly). In this manner the system learns an increasing vocabulary of elements. The elements database 103 also contains distilled words or word groupings that are determined not meaningful and should not be treated as validated elements. For example, the expression "preferred candidate" often appears in a job specification but is meaningless as a job element. The number of "not valid" words or word groupings considerably exceeds the number of valid elements. These stored "not valid elements" are used by the invention to automatically identify words or word groupings that can be ignored. As such, as the invention processes and identifies more "not valid elements", the overall actual processing time becomes faster.

Every element stored in the elements database 103 includes an element ID number, a plain English name, the number of words that comprise the name, an assigned category description and a frequency count of the number of times the element has been presented for validation. Every new element added to the elements database 103 has been through the validation process described above. Every new element added to the database has been reviewed and validated by human operators.

As mentioned above, FIG. 5 is a flow chart depicting the process for removing an unneeded section from the job spec (206). An operator (505) manually removes 502 the section using a section removal tool (504). Use of the section Removal Tool (504) is described in FIG. 6.

Figure 6:
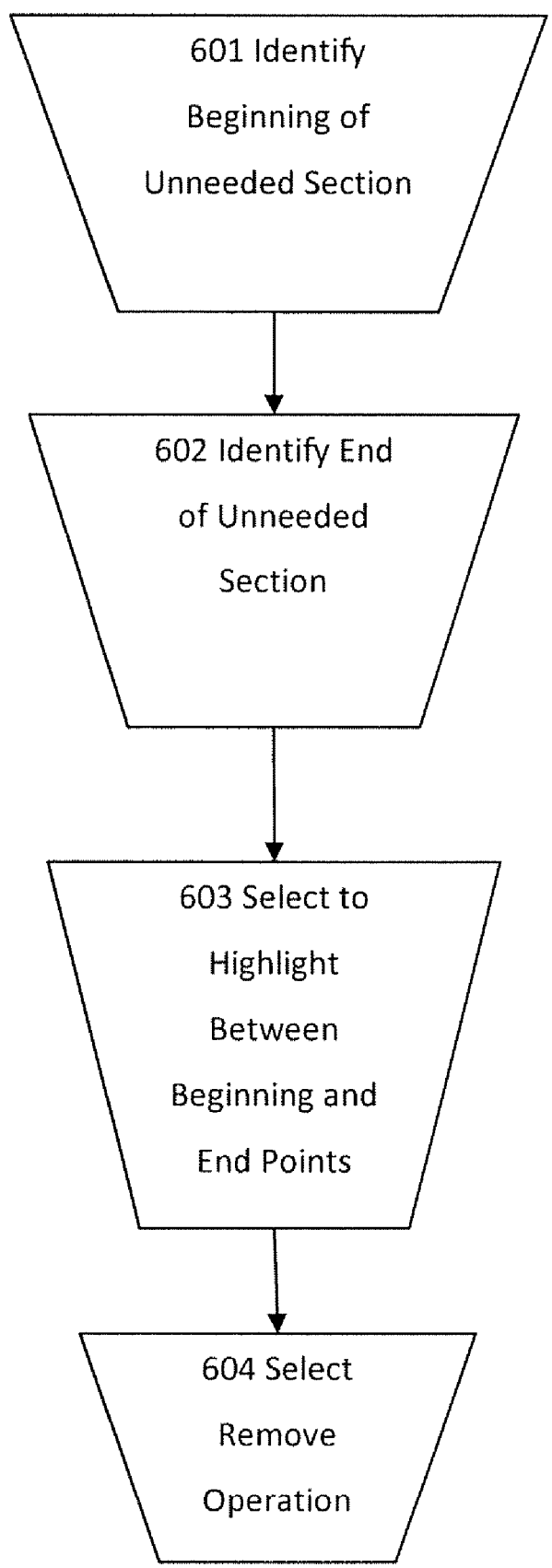
FIG. 6 is a flow chart depicting a portion of the system for analyzing job specifications, including showing portions which involve operator-directed, manual processes of removing or eliminating unneeded sections of the job description.

FIG. 6 illustrates the steps an operator follows to remove the unneeded section using the Removal Tool (504). This is a manual software aided process using conventional practices.

Figure 7:
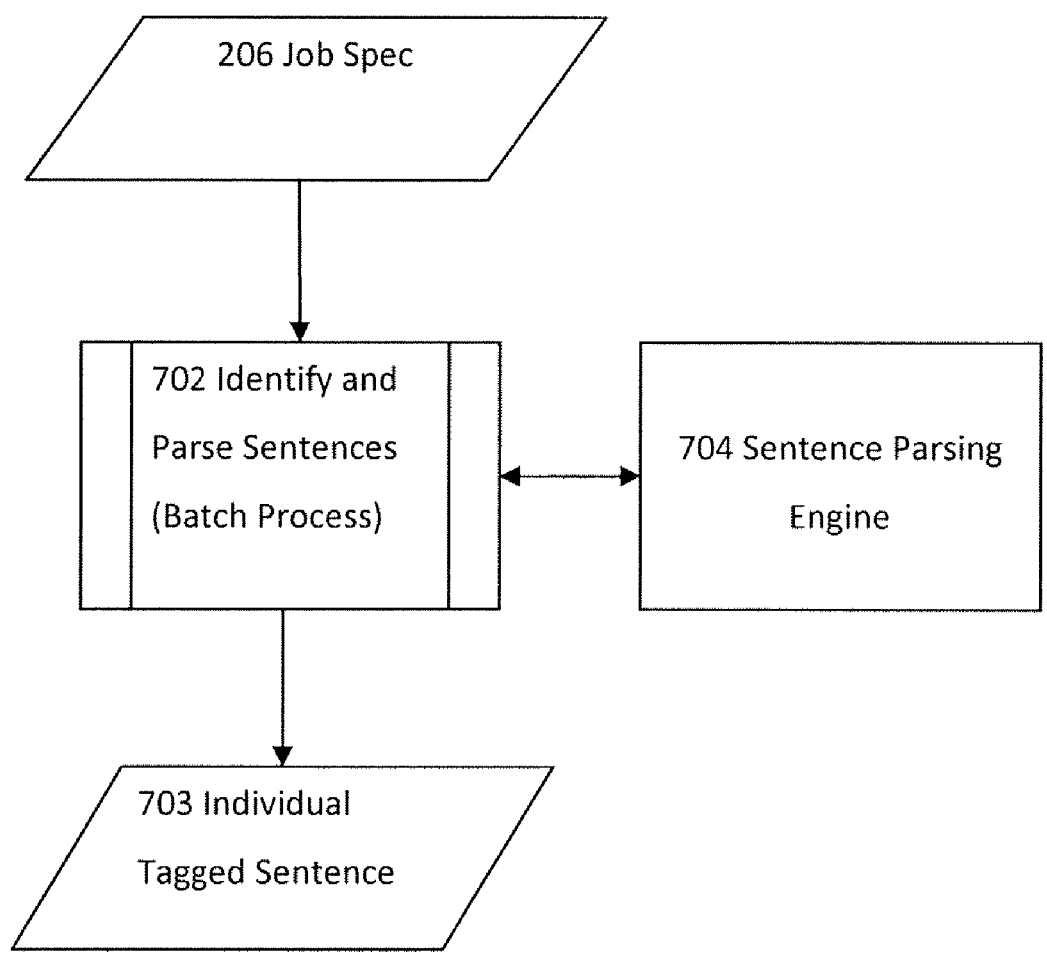
FIG. 7 is a flow chart depicting a portion of the system for analyzing job specifications, including the automated process for parsing sentences from the job description.

As shown in FIG. 7, the job spec (206) file is processed by the Sentence Parsing Engine (704) in order to identify and uniquely tag each separate sentence. The Sentence Parsing Engine (704) recognizes and processes full, incomplete, and partial (limited word) sentences. The Sentence Parsing Engine works on rules based filtering in which the rules are heuristics derived from examining many natural language expressions for job specifications. For example, does the string of text under consideration have a period at the end? If yes, consider this a complete sentence. In this case the period is a sentence delimiter. Another example is a string of words under consideration that ends with a carriage return and the next word on the following line is capitalized. The ending carriage return and the following capital letter is a sentence delimiter. While not proper English grammar, such an organization is a recognized format for many natural language expressions of job specifications (and resumes). Another example is a string of words ending with a number followed by a period and single space. This number, period, and single space are considered a sentence delimiter. The Sentence Parsing Engine automatically tags each parsed sentence with a Job ID and Sentence ID. The spec 206 is received and processed in batch mode 702 by engine 704. The logic outputs 703 the tagged, i.e., delimited, sentences.

Figure 8:
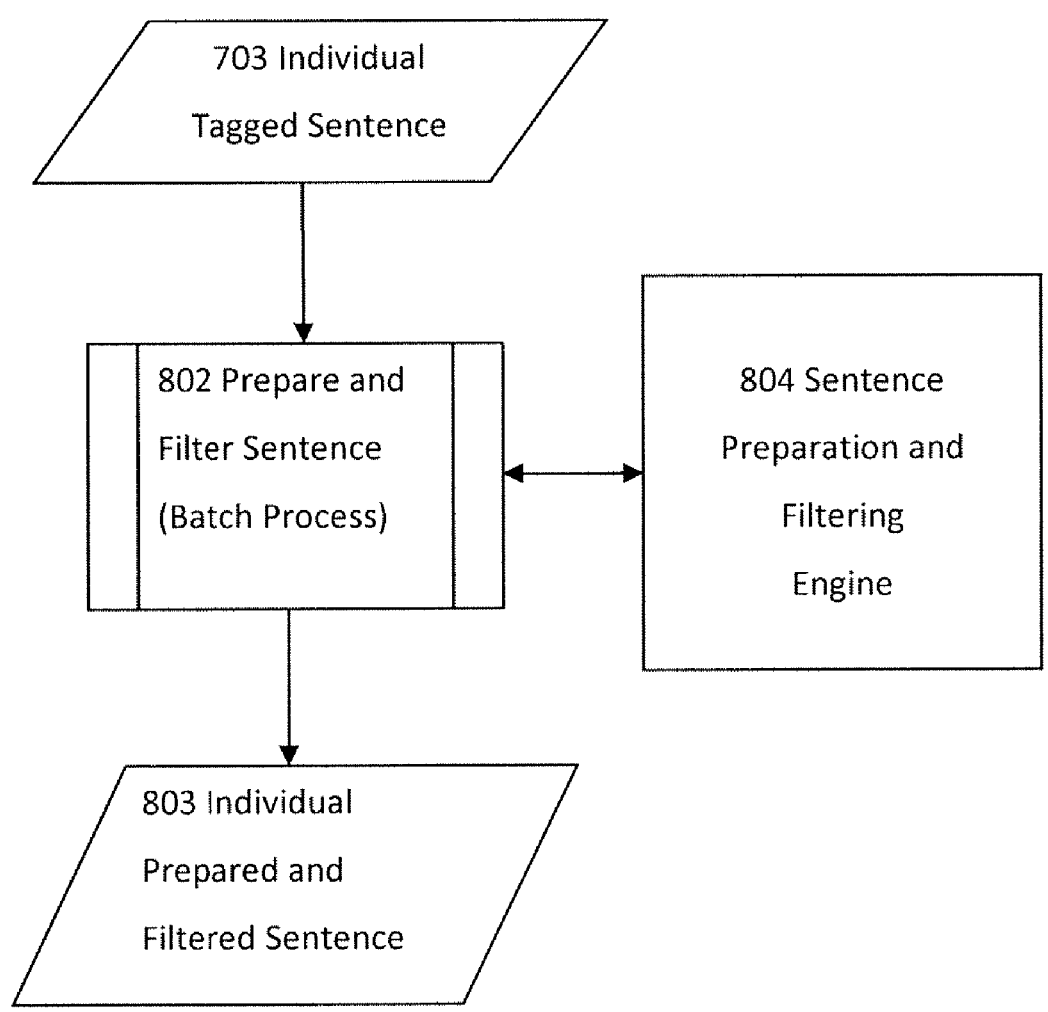
FIG. 8 is a flow chart depicting a portion of the system for analyzing job specifications, including the automated process to prepare and filter sentences from the job description.

As shown in FIG. 8, each individual parsed and tagged sentence (703) is received and processed in batch mode 802 by the Sentence Preparation and Filtering Engine (804). This special purpose engine processes special characters such as parentheses, apostrophes, hyphens, colons, brackets, ellipses, ampersands, etc., in accordance with predefined process rules for each character. For example, parentheses are removed and excluded from the filtered sentences 803 that are eventually output. The engine also normalizes certain words to a predefined standard value (based on conjugations as opposed to frequency). For example, the word "Intel's" is normalized to "Intel".

Figure 9:
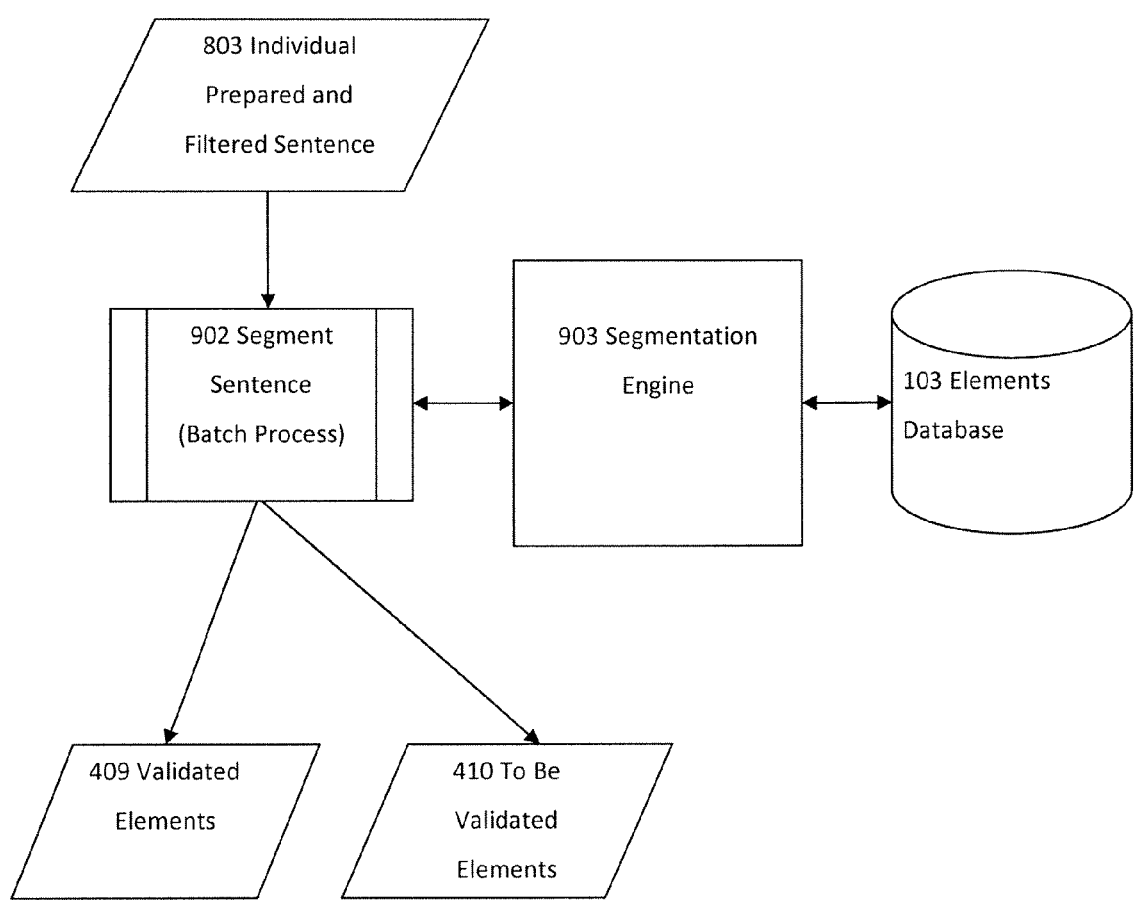
FIG. 9 is a flow chart depicting a portion of the system for analyzing job specifications, including the automated process using the segmentation engine to segment sentences into elements, then comparing the results to the elements database to validate and separate out those elements already in the database from elements that are new and need to be classified.

In FIG. 9, the filtered sentences 803 are processed in batch mode 902 by the Segmenting Engine (903). Engine 903 automatically separates complex sentences that contain multiple topics (typically skills or experience requirements) into individual sentence segments containing a single unique element of information or topic. The Segmenting Engine does this task by comparing single words (typically nouns), and two and three word combinations (typically containing a noun and a verb), to database 103 of known topics or elements relevant to the occupation or industry under consideration. Before finalizing a segment and passing it on to the next step, the engine compares the information element that comprises a segment to a database (103) of known and validated information elements to determine whether the element is already known and in the database or is unknown within the invention at this time. If the element that comprises the segment is already in the database (103), the segment containing the element is tagged as a validated element (409). A frequency count is updated for every element presented for validation as shown in FIG. 16. If the segment containing the element is not in the database (103), it is tagged as an element to be validated (410).

Figure 10:
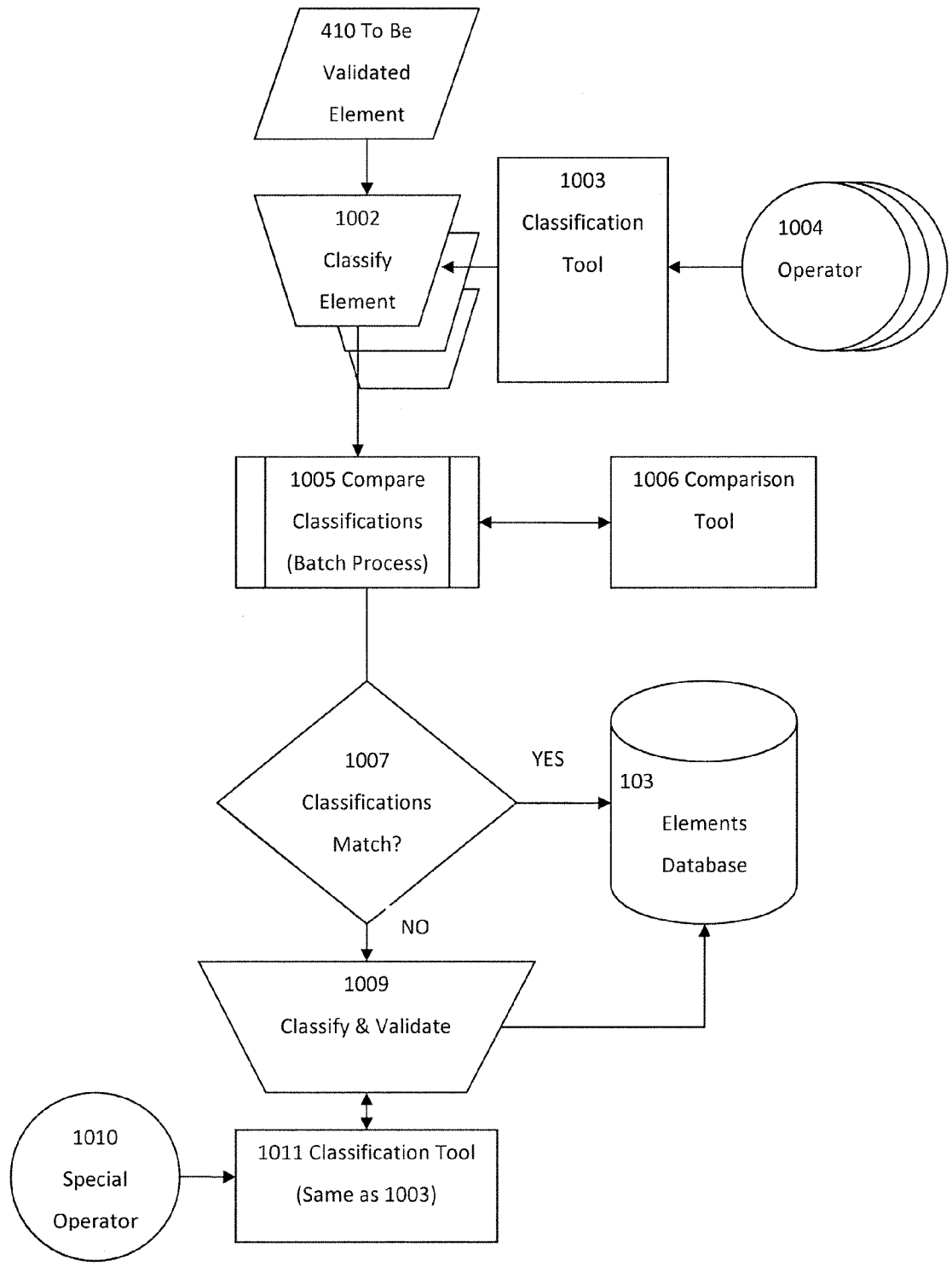
FIG. 10 is a flow chart depicting a portion of the system for analyzing job specifications, including operator-directed, manual process of classifying elements, comparing classifications for the same element from multiple operators, validating elements that have been similarly matched by all operators, and processing elements for classification when the original classifications from multiple operators did not match.

As shown in FIG. 10, the To Be Validated element (409) is presented to multiple human Operators (1004) using a Classification Tool (1003). Each operator selects a classification option for the same element to classify 1002 the element.

Possible classification options include the following among others: level, role, experience, tool, industry, etc. The operator (1004) selected classifications are automatically compared 1005 using the Comparison Tool (1006) in a batch process. If the classifications selected by multiple Operators (1004) all match 1007, element is validated and stored in the elements Database (103). If the classifications selected by multiple Operators (1004) do not all match, the element under consideration is then classified by a Special Operator (1010), using the Classification Tool (1011), and the element is considered validated 1009 and stored in the elements Database (103).

The Candidate Resume/Profile Analyzer

Figure 11:
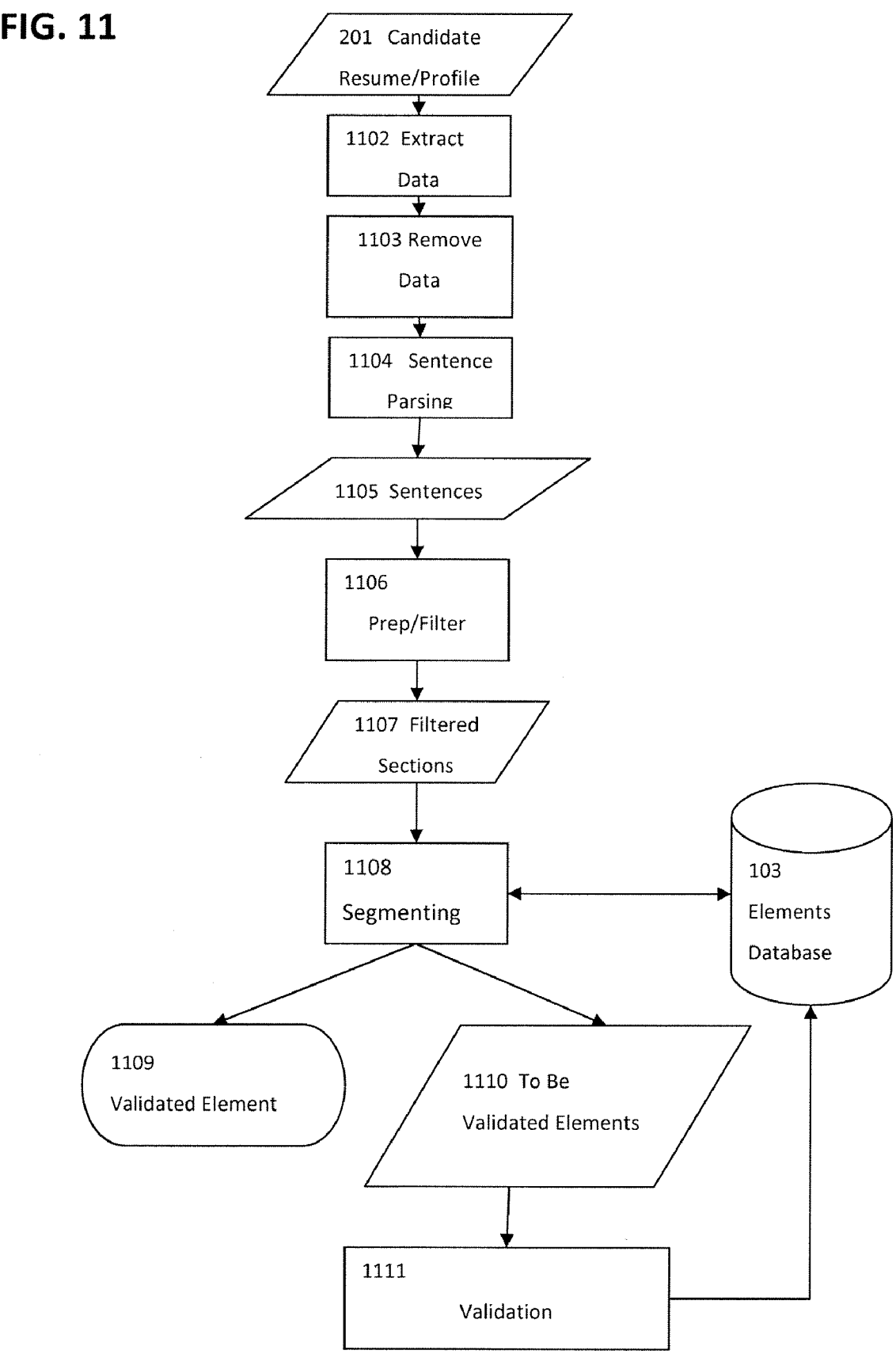
FIG. 11 is the process flow for a portion of the system that analyzes candidate resumes.

FIG. 11 is a flow chart of the logic for the candidate resume analyzer system 202. The logic receives candidate resumes (or profiles) 201 as input. The first step 1102 is to automatically extract data from the candidate resume/profile. The data extracted includes contact information, candidate objective, job titles, organization names, education information, etc. Data extraction is processed using conventional resume extraction products such as Resume Mirror.

The next step 1103 is to remove data that will not be converted into elements. Contact information, for example, is not going to be converted into elements. The process for removing data from the resume is a software aided conventional practice. This process is effectively the same as the process for removing unneeded data from a job specification as shown in FIG. 6.

The next step, 1104, is to identify and parse out individual sentences from candidate resumes/profiles. This process is described in detail in FIG. 12. The sentence parsing process for candidate resumes/profiles is effectively the same as for job specifications (403). The Sentence Parsing Engine for candidate resumes/profiles is the same as for job specifications (704). Parsed sentences 1105 are output.

The next step is 1106, Prep/Filter. This process is described in FIG. 13. The Prep/Filter process for candidate resumes/profiles is effectively the same as the Prep/Filter process for job specifications FIG. 8. The Sentence Preparation and Filtering Engine for candidate resumes/profiles is the same as for job Specifications FIG. 804. Filtered segments 1107 are output.

The next step is 1108, Segmenting. This process is described in FIG. 14. The Segmenting process for candidate resumes/profiles is effectively the same as for job specifications (407). The Segmenting Engine for candidate resumes/profiles is the same as for job specifications (903).

Figure 15:
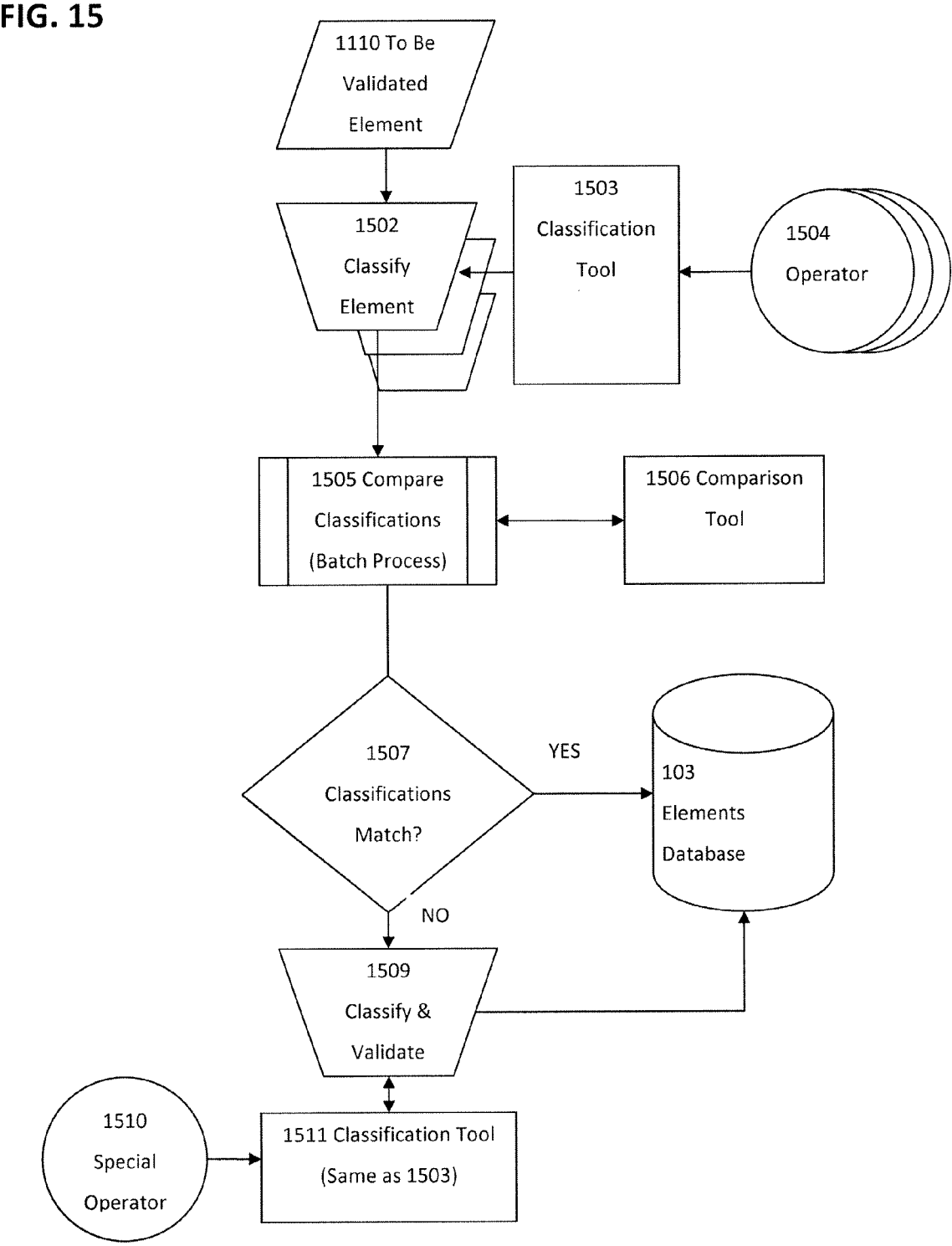
FIG. 15 is a flow chart depicting a portion of the system for analyzing candidate resumes, including the operator-directed, manual process of classifying elements, comparing classifications for the same element from multiple operators, validating elements that have been similarly matched by all operators, and processing elements for classification when the original classifications from multiple operators did not match.

In FIG. 11, the final step is 1111, Validation. This process is described in FIG. 15. The Validation process for candidate resumes/profiles is the same as for job specifications (410 & 411) and. As shown in FIG. 15, the To Be Validated element (1101) is presented to multiple Operators (1504) using the Classification Tool (1503). Each operator selects a classification option for the same element. Possible classification options include the following among others: level, role, experience, tool, industry, etc. The operator (1504) selected classifications are automatically compared using the Comparison Tool (1506) in a batch process. If the classifications selected by multiple operators (1504) all match the element is validated and stored in the elements database (103). If the classifications selected by multiple operators (1504) do not all match, the element under consideration is then classified by a special operator (1510), using the Classification Tool (1511), and the element is considered validated and stored in the elements database (103).

Figure 12:
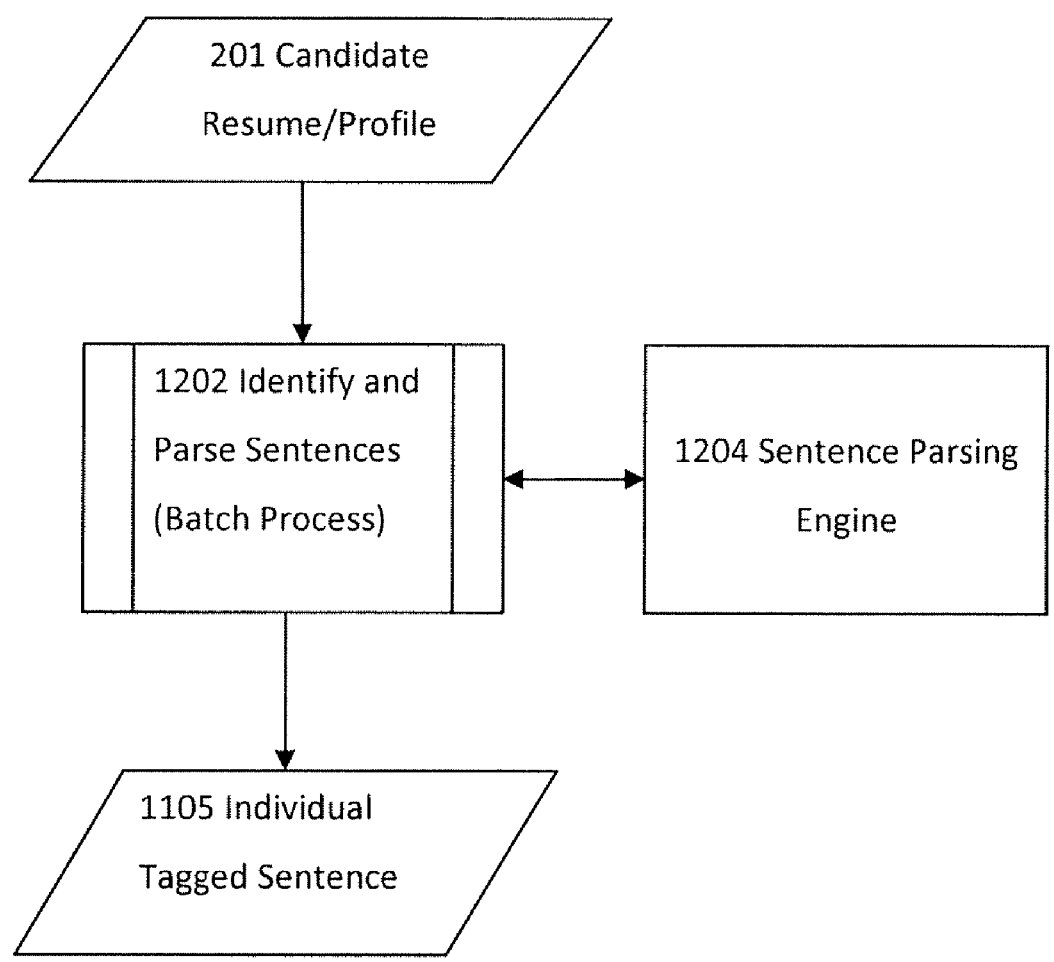
FIG. 12 is a flow chart depicting a portion of the system for analyzing candidate resumes, including the automated process for parsing sentences from the candidate resume/profile.

As in FIG. 12, the candidate resume/profile (201) file is processed by the Sentence Parsing Engine in order to identify and uniquely tag each separate sentence. The Sentence Parsing Engine (1204) recognizes and processes full, incomplete, and partial (limited word) sentences. The Sentence Parsing Engine (1204) tags each sentence with a Job ID and Sentence ID. Candidate resumes/profiles (1201) files are processed by the Sentence Parsing Engine (1204) in batch mode 1202. Parsed sentences 1105 are output.

Figure 13:
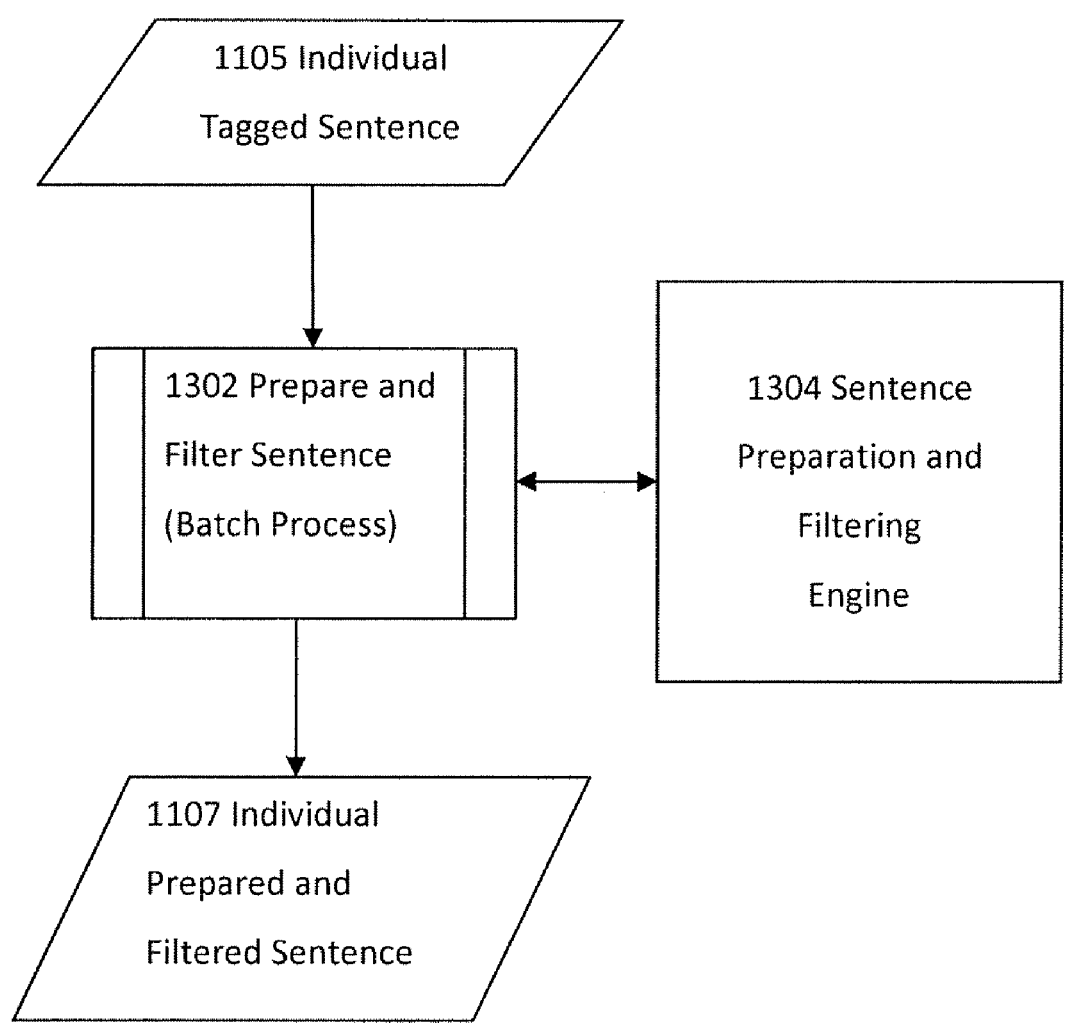
FIG. 13 is a flow chart depicting a portion of the system for analyzing candidate resumes, including the automated process to prepare and filter sentences from the candidate resume/profile.

As shown in FIG. 13, each Individual Tagged Sentence (1105) is processed by the Sentence Preparation and Filtering Engine (1304). This engine processes special characters such as parentheses, apostrophes, hyphens, colons, brackets, ellipses, ampersands, etc., in accordance with predefined process rules for each character. For example, parentheses are removed and excluded from the sentence. The engine also normalizes certain words to a predefined standard value. For example, the word "Intel's" is normalized to "Intel". Individual Tagged Sentence files (1301) are processed on a batch basis 1302. Filtered sections 1107 are output.

Figure 14:
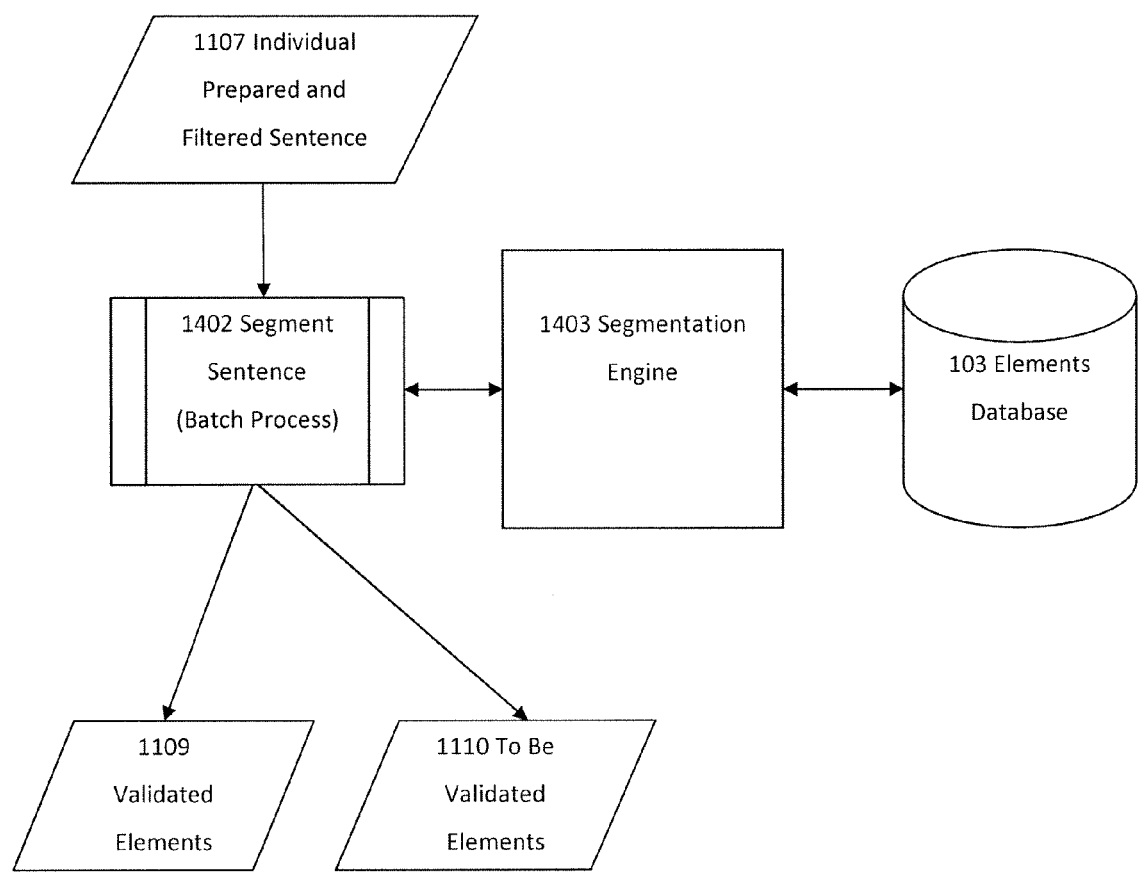
FIG. 14 is a flow chart depicting a portion of the system for analyzing candidate resumes, including the automated process using the segmentation engine for segmenting sentences into elements, comparing the results to the elements database to validate and separate out those elements already in the database from those elements that are new and need to be classified.

In FIG. 14, the Segmenting Engine (1403) separates complex sentences that contain multiple topics into individual sentence segments containing a unique element of information or topic. Before finalizing a segment and passing it on to the next step the engine compares the information element that comprises a segment to a database of known and validated information elements (103) to determine whether the element is already known and in the database or is unknown within the invention at this time. If the element that comprises the segment is already in the database (103), the segment containing the element is tagged as a validated element (1405) and the frequency count for the element is updated. If the segment containing the element is not in the database (103), it is tagged as an element to be validated (1406). Individual Prepared and Filtered Sentence files (1107) are processed on a batch basis 1402.

Normalization

The element extraction process as shown in FIG. 4 (for job specifications) and FIG. 11 (for candidate resumes/profiles) produces job elements (words, word pairs, and word groupings) that are stored in an elements database 103. Job specifications and candidate resumes or profiles are extracted using the same data flow and similar methodology but they are on separate processing paths, with corresponding but different processing rules, and the processed source files are stored in separate databases. However, there is only one common elements database 103.

The number of times that each job element has appeared in a file that has been processed is also stored in the database as a cumulative addition producing a frequency of occurrence count for that element. Periodically the element table is reviewed by a data analyst and certain elements will be normalized to a common value. The normalization of job specification and candidate resume/profile data elements based on frequency analysis facilitates processing while retaining natural language expressions for the topics/elements of interest. However, the processing uses the most frequently used natural language expression from semantically similar expressions (roughly speaking—synonyms). The initial linking of a new element to a normalized common value element, in effect the designation of a synonym element, is preferably done by a human operator. Thereafter, should this synonym element appear again, its frequency count only needs to be incremented as the link between the synonym and the normalized common value remains intact.

The element variation that occurs most frequently in the elements database 103, becomes the standard, or normalized, descriptor for that element. For example, in FIG. 16, the element "A/D Converter" (1607), has occurred in 1,467 (1611) of 1,699 (1601) files that have been processed to-date. Therefore, "A/D Converter" (1607) is selected as the standard or normalized value for this group of 4 related elements (1607, 1688, 1609, and 1610). The elements "AD Converter" (1608), "A to D Converter" (1609), and "Analog to Digital Converter" (1610) will be linked to the element "A/D Converter" (1607) as job domain specific synonyms.

This normalized value for the element (1607) is always substituted for the synonyms (1608, 1609, 1610) when calculating workforce talent supply and demand, and for matching operations, for the skill or experience represented by the element.

Normalization ensures that variations in natural language do not obstruct the process of matching job elements between job specifications or between a job specification and a job-seeker resume/profile.

Human operators periodically review the elements database 103 and manually create links between the synonym and the normalized value using a conventional software support tool.

Classification

Preferred embodiments of the invention classify and tag job specifications and candidate resumes and profiles in order to rapidly match candidates to job specifications for the purpose of calculating talent supply sampling metrics.

Classification occurs as shown in the data flow diagram FIG. 2. Candidate resumes/profiles are classified in step 204. Job specifications are classified in step 208.

Figure 19:
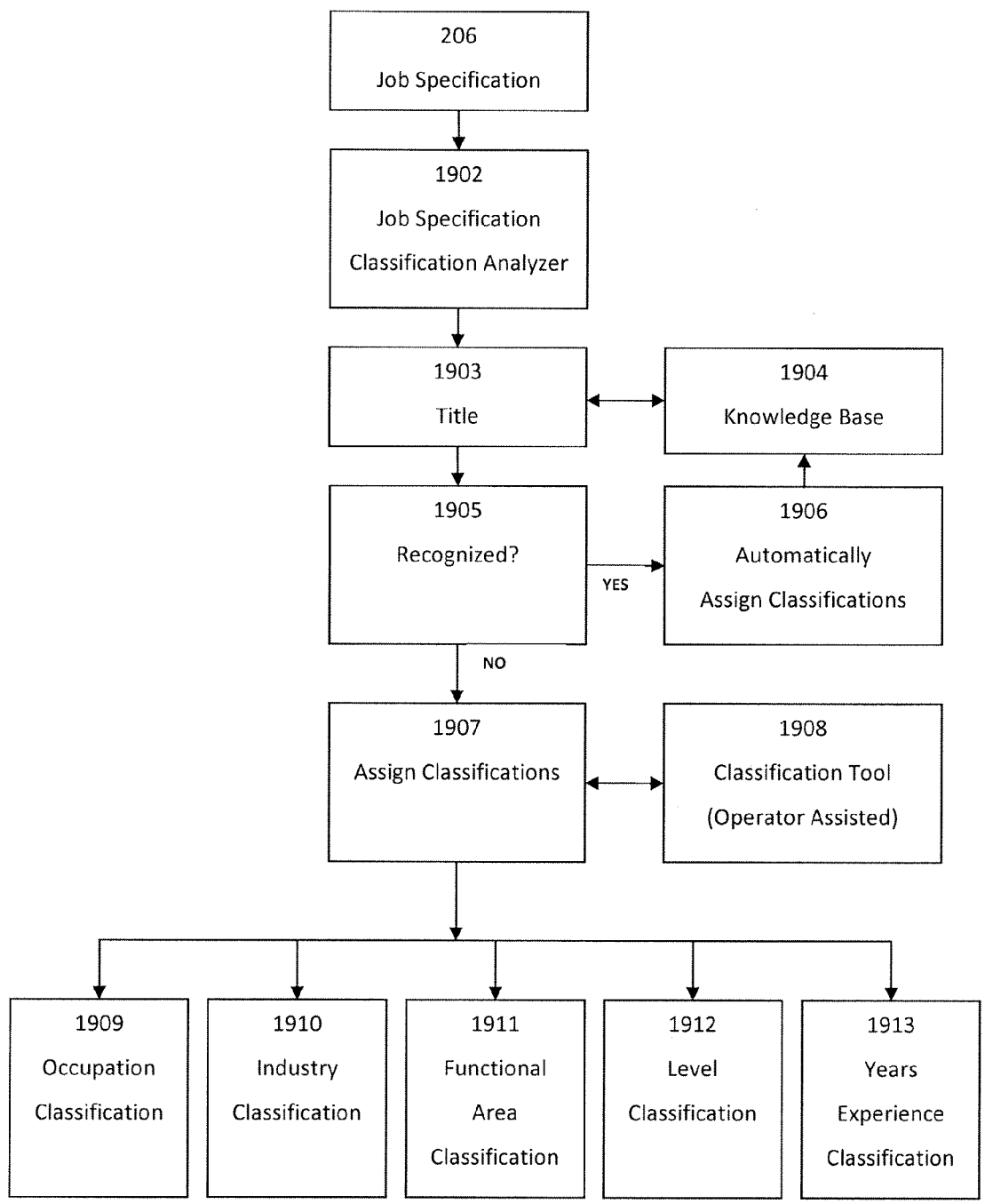
FIG. 19 depicts the classification process flow for job specifications.
Figure 20:
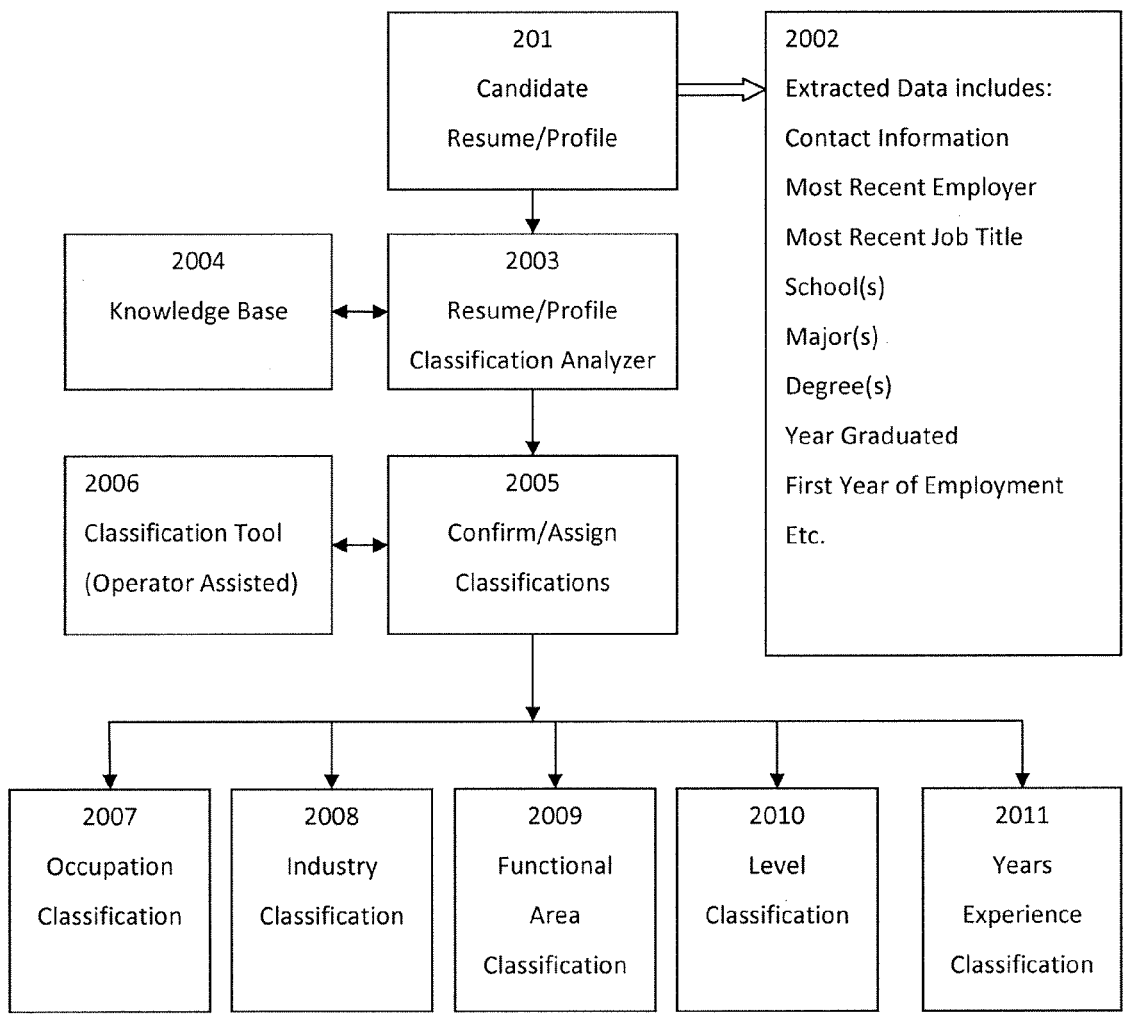
FIG. 20 depicts the classification process flow for candidate resumes/profiles.

The classification process provides a capability to rapidly recognize known data from unknown data. Known data is automatically associated with stored classifications. Unknown job specification data is processed for classification as shown in FIG. 19. Unknown candidate resume/profile data is processed for classification as shown in FIG. 20. For example, if the invention has already identified and classified Thames Valley Engineering, Inc. (301) as a company with primary NAICS industry code 334418 (which is the NAICS code for Printed Circuit Assembly Manufacturing), the next time a new job specification arrives from Thames Valley Engineering, Inc., its industry classification code 334418 will be automatically assigned or tagged to the job specification ID number. In addition, should a new candidate resume/profile arrive, and the candidate worked for Thames Valley Engineering, Inc., the resume/profile will be automatically assigned or tagged with the industry classification code 334418.

Figure 17:
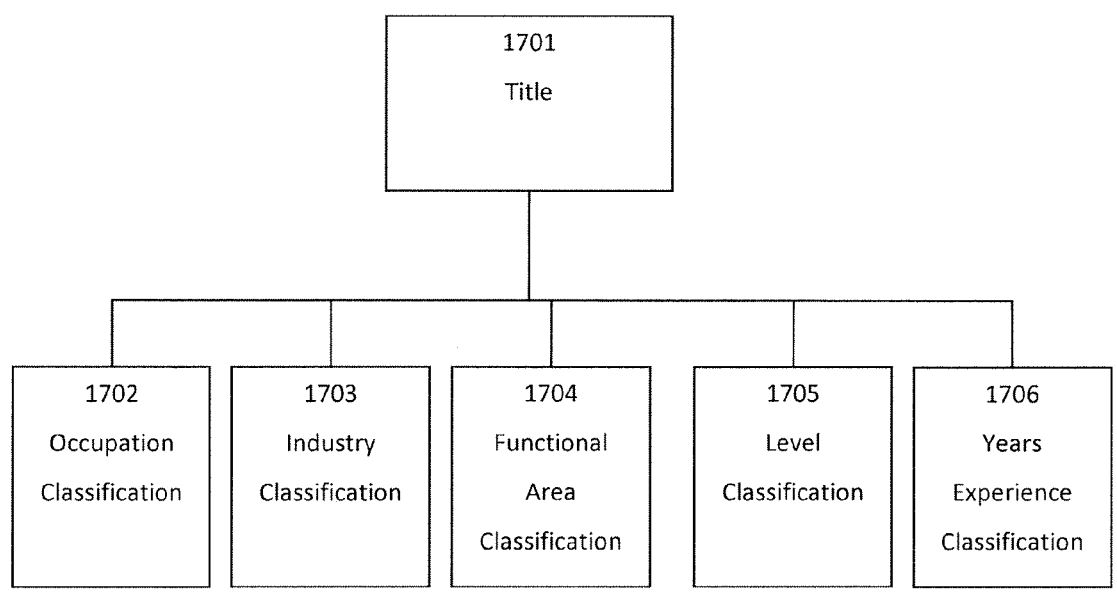
FIG. 17 shows the classification categories for job titles. This is additional detail for the classification step shown in FIG. 208.

The classification categories for job specifications are shown in FIG. 17. Each job specification has a title (1701) that is assigned by the company creating the job specification. The system assigns classifications to each title. Key classification examples are: Occupation (1702), Industry (1703), Functional Area (1704), Level (1705), and Years Experience (1706).

The Occupation classification (1702) assigned is the most appropriate U.S. Bureau of Labor Statistics (BLS) occupational category.

The Industry classification (1703) assigned is the North American Industry Classification System (NAICS) code for the company that created the job specification.

The Functional Area classification (1704) assigned is the most appropriate descriptor for the job specification. Functional Area classifications include Sales, Quality, Engineering, etc.

The Level classification (1705) assigned is the most appropriate descriptor for the job specification. Level classifications include: Intern, Individual Contributor, Supervisor, Director, etc.

The Years Experience classification (1706) assigned is the most appropriate descriptor for the job specification. Years Experience classifications include: 0/No Experience, 1-2 Years, 3-5 Years, etc.

Figure 18:
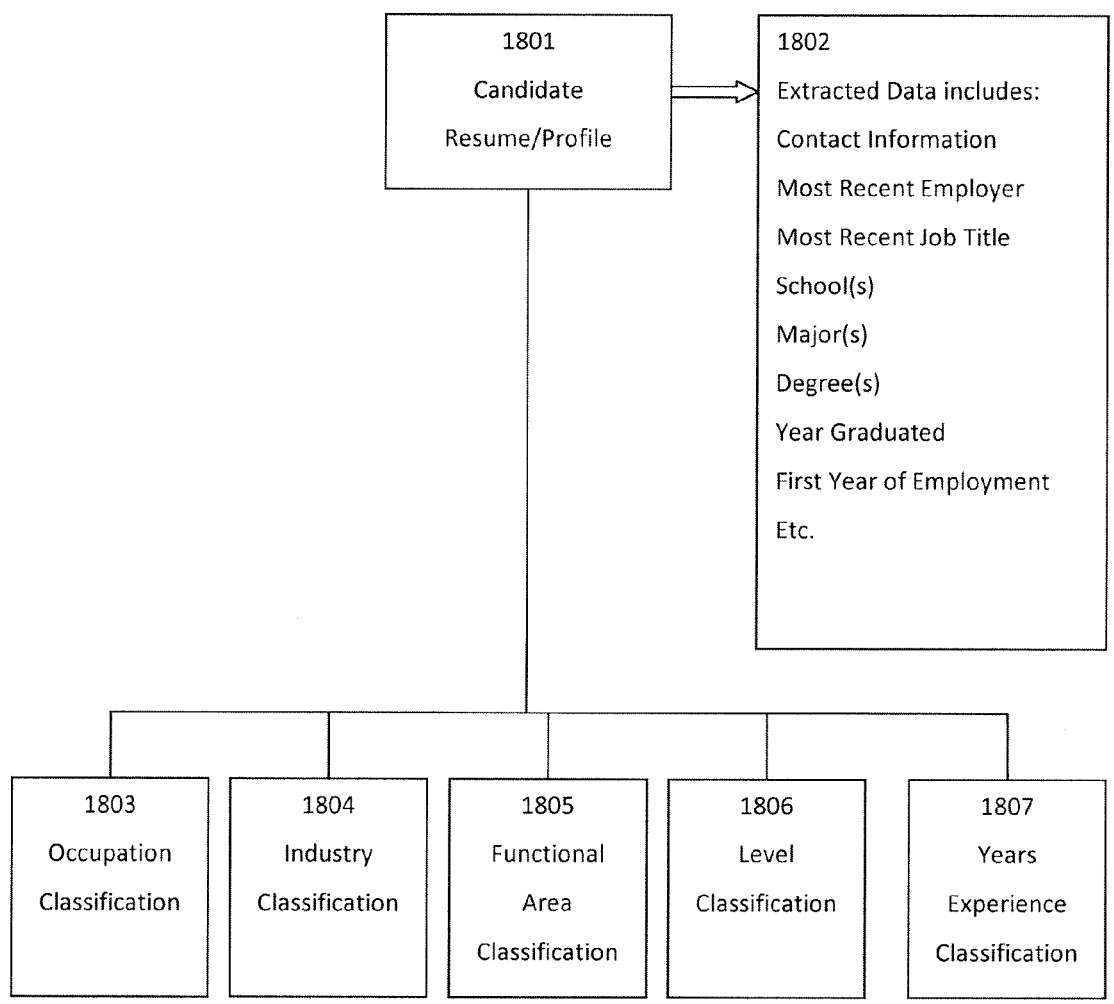
FIG. 18 shows the classification categories for candidate resumes/profiles and the data categories extracted from the candidate resume/profile.

The classification categories for Candidate Resumes/Profiles are shown in FIG. 18. The system assigns classifications to each candidate resume/profile. Key classification examples are: Occupation (1803), Industry (1804), Functional Area (1805), Level (1806), and Years Experience (1807). In addition, certain data is automatically extracted (if it exists) from each candidate resume/profile processed. This data is shown in FIG. 1802.

The Occupation classification (1803) assigned is the most appropriate U.S. Bureau of Labor Statistics (BLS) occupational category based on the candidate's current job title.

The Industry classification (1804) assigned is the North American Industry Classification System (NAICS) code for the company where the candidate most recently worked.

The Functional Area classification (1805) assigned is the most appropriate descriptor for the candidates recent work experience. Multiple Functional Area classifications are possible. Functional Area classifications include Sales, Quality, Engineering, etc.

The Level classification (1806) assigned is the most appropriate descriptor for the candidate's most recent job title and responsibilities. Level classifications include: Intern, Individual Contributor, Supervisor, Director, etc.

The Years Experience classification (1807) assigned is the most appropriate descriptor for the candidate's years of professional work experience. Years Experience classifications include: 0/No Experience, 1-2 Years, 3-5 Years, etc.

Job specification source data is collected by a process of analyzing job specifications from a specified corporate web site. As a result of this prior specification, the collected job specification files are automatically associated with a company name and industry classification using the North American Industry Classification System (NAICS).

In FIG. 19, the Job Specification Analyzer (1902) engine first compares the job title (1903) from a new job specification (206) to other job titles from this same company stored in a knowledge base (1904) of classified job titles. If a match exists, meaning the Job Title (1903) and company are recognized (1905) and match, the job title is automatically associated to the stored classifications (1906).

As shown in FIG. 19, if the title (1903) and company are not recognized and does not match any titles for companies in the knowledge base (1906), the title is routed for classification (1905).

In 1907, classifications are assigned to the title (1903) using an operator assisted classification tool (1908).

The more job specifications (206) the job specification analyzer engine (1902) processes, the more likely the knowledge base (1 904) will contain matching data and the classification process will be automatic and accurate.

FIG. 20 depicts the process for classifying candidate resumes/profiles. Certain specified data (2002) is extracted from the candidate resume/profile 201 and is associated to the resume.

The resume/profile analyzer (2003) attempts to classify the candidate resume/profile based on comparing the extracted data (2002) with stored data in the knowledge base (2004). For instance, the knowledge base may contain matches for the candidate's current job title and current employer. In this event, the resume/profile analyzer will assign the classifications associated to this title and employer combination to the resume/profile being processed.

Using the classification tool (2006), an operator will confirm the classifications assigned by the resume/profile analyzer, or manually assign the appropriate classifications (2005).

The more resumes/profiles the resume/profile analyzer engine (2003) processes, the more likely the knowledge base (2004) will contain matching data and the classification process will be automatic and accurate.

Workforce Talent Supply and Demand

Figure 21:
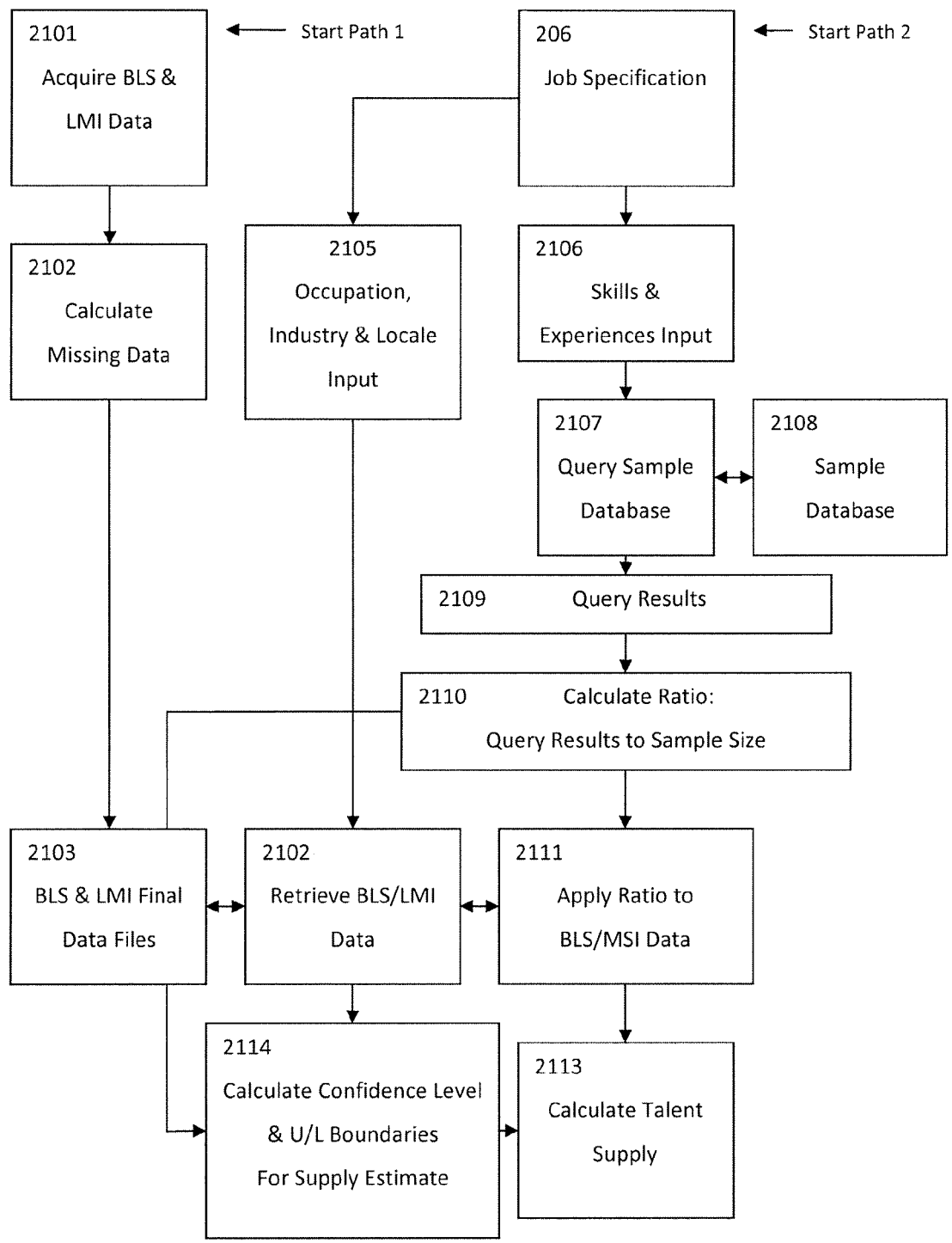
FIG. 21 shows the process flow for determining workforce talent supply and demand metrics.

Preferred embodiments of the invention calculate or estimate workforce talent supply data at the element level. FIG. 21 describes the process flow for determining workforce talent supply and demand metrics. There are two separate data flow paths used to calculate workforce talent supply and demand. The two paths may be started independently.

US Bureau of Labor Statistics (BLS) is used as a data source (211) to determine the national supply of workforce talent by occupation. The BLS national occupation supply data is cross-indexed by industry using North American Industry Classification System (NAICS) industry designations. For example, the NAICS code for Thames Valley Engineering, Inc. (301) might be 334418, which is the NAICS code for Printed Circuit Assembly Manufacturing. The job title "Analog Design Engineer" (302) shown on the job specification in FIG. 3 for Thames Valley Engineering, Inc. is an electrical engineering position. The BLS occupational code for Electrical Engineering is 17-2071. This means for the job specification shown in FIG. 3, the invention would use the BLS workforce population data for industry code 334418 and occupation code 17-2071

Individual State Labor Market Information (LMI) sources are the data sources (2101) used to determine the state supply of workforce talent by BLS occupation and NAICS industry designations. State LMI's are also the data source for workforce talent supply broken out into Metropolitan Statistical Areas (MSAs).

Where needed, classical Bayesian statistical inference techniques are used to infer missing national or state data (2102). For example, the number of Electrical Engineers working in the Semiconductor Industry in the Salt Lake City Area was not reported in the 2006 BLS Occupational Census. The final data files (2103) include reported or inferred workforce population data for each targeted occupation in each targeted industry, for every state, as well as nationally.

BLS and LMI data provides workforce talent supply metrics for approximately 820 broad occupational categories. In order to calculate workforce talent supply for specific combinations of skills and experiences, the system incorporates probability theory and statistical sampling techniques to derive predictions of the talent supply. For example, the NAICS code for Thames Valley Engineering, Inc. (301) might be 334418, which is the NAICS code for Printed Circuit Assembly Manufacturing. The job title "Analog Design Engineer" (302) shown on the job specification in FIG. 3 for Thames Valley Engineering, Inc. is an electrical engineering position. The BLS occupational code for Electrical Engineering is 17-2071. This means for the job specification shown in FIG. 3, the invention would use the BLS workforce population data for industry code 334418 and occupation code 17-2071. For this example assume the BLS workforce population was listed as 10,000. The invention would then query the Candidate Resume/Profile Database (102) for the job elements selected as "must have" elements. Assume in this example the query results were 500, and the number candidates in the Candidate Resume/Profile Database classified with NAICS industry code 334418 and BLS electrical engineering occupational codes was 2,000. This means 500 out of 2,000 candidates, or 25% of the sample had the required "must have" job elements. The invention would then infer the total BLS workforce population with the same job elements to be 2,500 or 25% of the known BLS population of 10,000. The invention would also calculate and display the confidence level for this inference given the sample size of 2,000, the BLS population size, and the BLS reported relative standard error. This is a classic statistical calculation.

The job specification (206) is the source or input for occupation, industry and locale requirements (2105). A user selects the combination of skills and experiences for which workforce talent supply metrics are sought (2106). The system queries (2107) a sampling database (2108) to determine the number of matches within this sample (2109). The sampling database is the number of unique candidate resumes/profiles stored in the Candidate Resume/Profile Database (102), who also have been classified with the NAICS industry code assigned or tagged to the job specification (FIG. 3), and also classified with the BLS occupation code assigned or tagged to the position title (302) for the job specification. This sample database, with the appropriate NAICS code and BLS occupation code, is therefore a subset of the Candidate Resume/Profile Database (102). The system determines the ratio of the number of matches from the query to the total sample (2110).

In 2111, the ratio as shown in 2110 is applied to the appropriate BLS/LMI data (2112), for the occupation, industry and locale required, to calculate the total workforce talent supply (2113) for the selected combination of skills and experiences in the designated geographic labor markets.

In 2114 the system calculates the statistical confidence level and upper and lower boundaries of the workforce talent supply estimates for the combination of skills and experiences selected, using the appropriate BLS/LMI data file counts (2112), combined with the query results count and the sample database size count from 2110.

Workforce talent demand data is the current number of open and publicly posted job specifications or requisitions from organizations in the industry under consideration, seeking candidates from the appropriate occupational categories, with the same skills and experiences as defined by the set of job elements distilled from the job specification. This is point of time data and will vary from update to update. In order to calculate this number the system periodically analyzes a predefined number of organizational public job sites and processes the observed job specifications as described in FIG. 4. The system utilizes conventional practices to analyze organizational job sites to retrieve job posting data.

The User Interface

Figure 22:
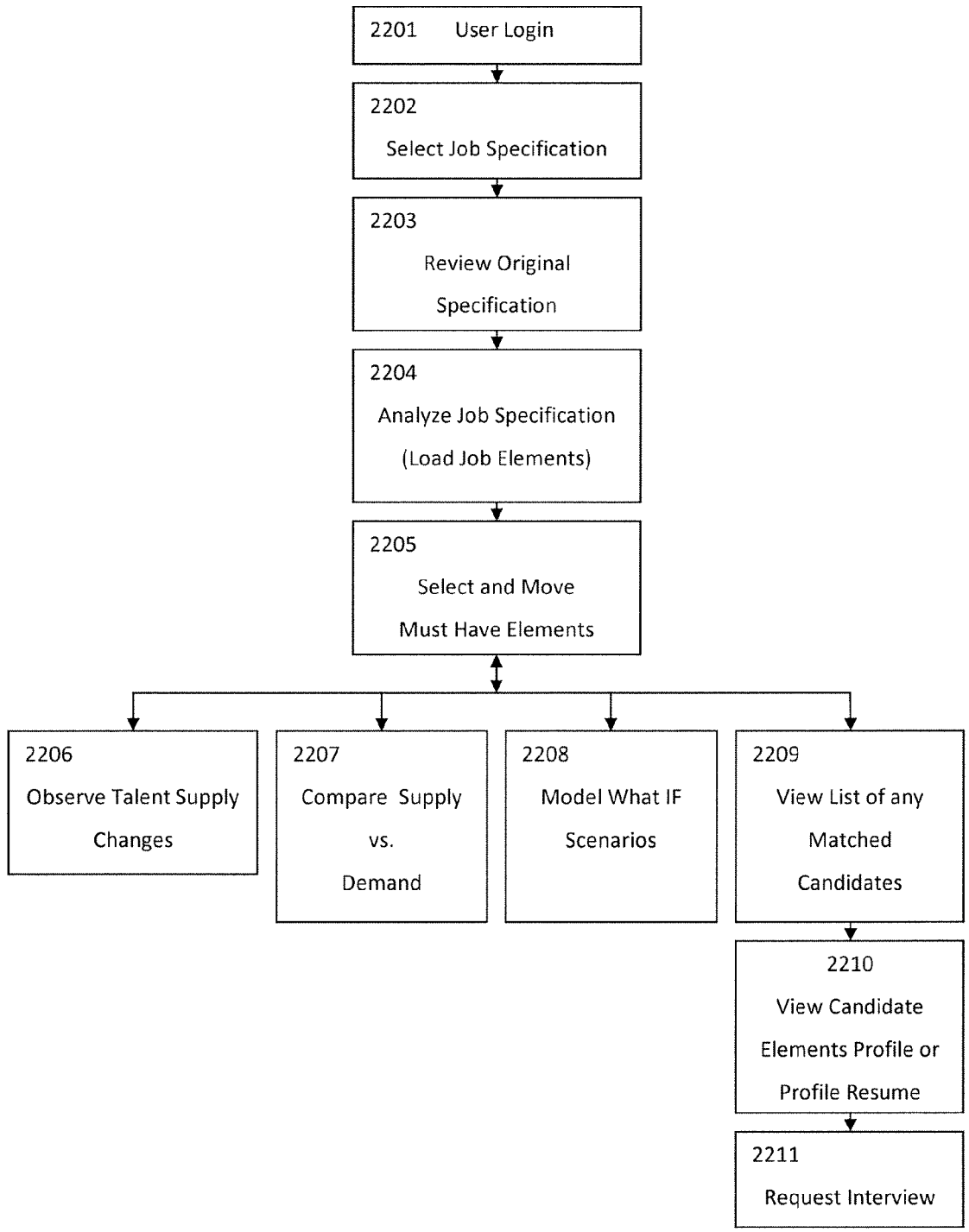
FIG. 22 depicts a typical user process flow in the user interface.

The system is accessed by a user via the Internet using a standard web browser directed to a specified URL. A typical user work flow in the User Interface is shown in FIG. 22. The user logs into (2201) the inventions User Interface with a pre-assigned and unique user name and password.

A display presents all the job specifications available for that user and the user selects a job specification to work (2202) on from the list of all the included job specifications. The job specifications have been previously scraped from a web based job site associated with the user name. Each job specification is identified by a number (or other identifying code), and job title.

A keyword search facility searching against the identification number or job title is available as a filter to provide direct access to a specific job specification from a large list of specifications. The user also has a facility to load a job specification from a PC, or to create a job specification using the invention. The user starts by viewing the specification in its original text (2203). In the same view the user can select to next automatically load and then view (2204) all the skill and experience elements associated with the job specification.

Figure 23:
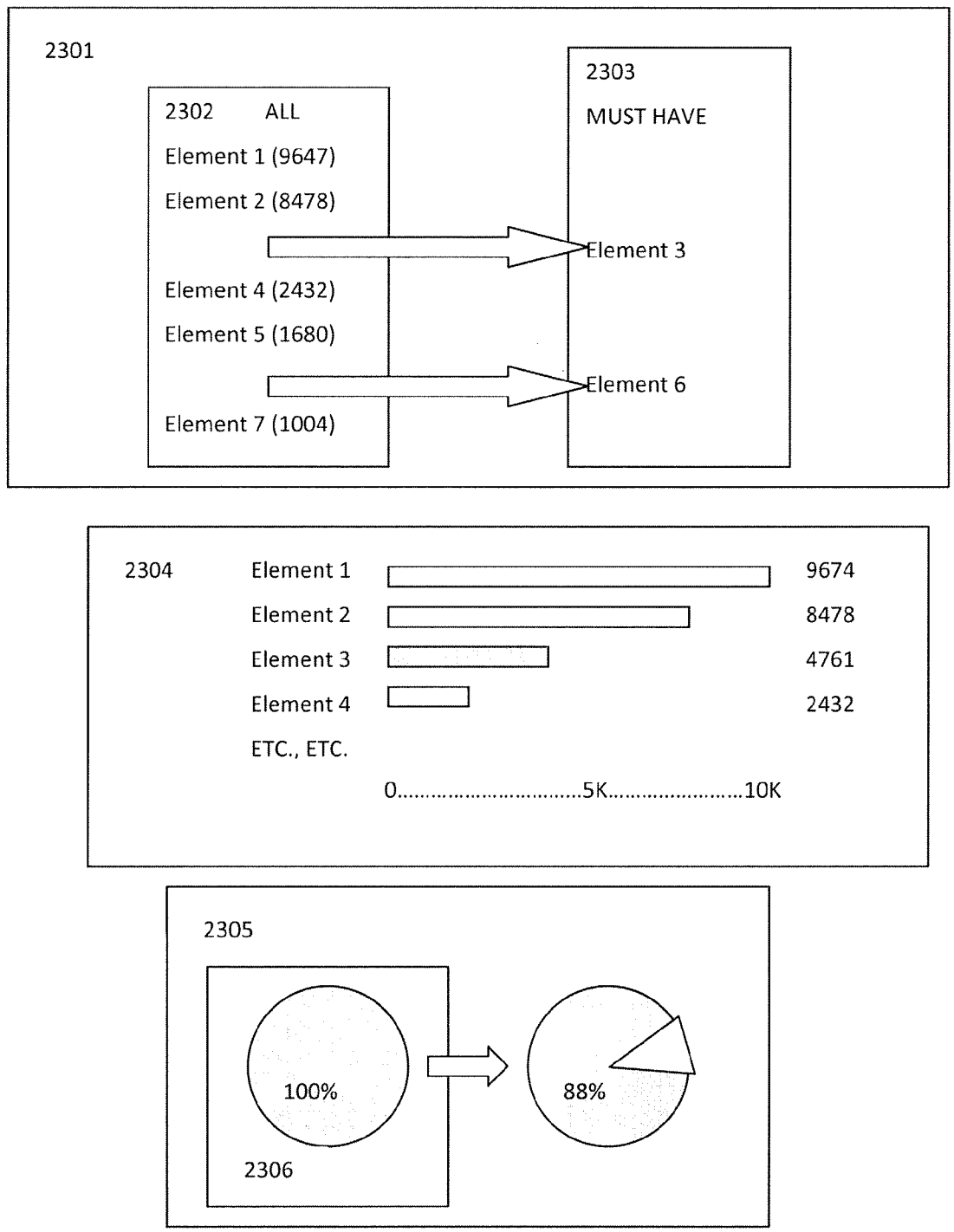
FIG. 23 shows aspects of the user interface.

FIG. 23 shows aspects of the User Interface. Item 2301 depicts a user moving job elements from the master all element list 2302 into the Must Have section 2303 of the User Interface workspace. Item 2304 depicts the bar graph that displays all the job elements, their associated talent supply totals, and an element selected as a Must Have element. Item 2305 depicts how the talent supply pie-chart changes from 100% to a <100% value as job elements are moved into the Must Have section of the User Interface workspace.

As shown in 2301, the elements are displayed in a work space area of the User Interface. Associated to each element is a workforce talent supply number indicating the available national talent pool for each element shown, individually. The text describing the element is also color codes to distinguish high talent pool availability elements from those with less availability. As shown in 2304 the list of elements is also displayed in a bar graph with the size of the national talent pool for each element determining the length of the bar. This bar graph is located in a section or tab of the User Interface named Market Supply. Also in this section is a table listing various workforce talent supply pool totals. This table provides workforce talent supply data by location(s), occupation and by element(s). This section also includes a pie-chart (2306) representing the total workforce talent supply pool. The pie-chart is at 100% before elements are moved into the Must Have section of the workspace.

The workspace section of the User Interface has two user modifiable segments. Initially, one segment (2301) lists all of the elements extracted from the job specification. The second segment, labeled Must Have, is initially empty. As shown in 2301, to model different job specification variations and view the resultant effect on the workforce talent supply pool (2206), the user moves elements from the master list segment (2301) into the Must Have segment (2303) of the workspace section. The list of elements moved to the Must Have section can be saved and named for easy future retrieval.

The process of selecting and moving elements in and out of the Must Have section of the User Interface workspace is often repeated several times in order to determine which combination of Must Have elements will yield the optimum workforce talent supply pool and potential candidate pool for the job specification under consideration. This dynamic real-time modeling of requirements vs. availability of talent supply is a key capability of the User Interface.

When an element is moved from the master list into the Must Have segment of the workspace section, a series of changes occur in the User Interface. The number representing the total workforce supply pool for the remaining elements on the master list changes to numbers that represents the workforce talent supply for these remaining elements in conjunction with the element just moved into the Must Have segment. This, in essence, becomes a predictive indicator of the workforce talent population for the element just moved into the Must Have section and each of the remaining Elements in the master list, individually. The invention recalculates the population numbers assuming a Boolean AND join between the element just moved into the Must Have section and each of the remaining elements on the master list. If a remaining element is not found in conjunction with a Must Have element in the sample database, the element now displays a zero predictive population indicator and also changes color. In the Market Supply section of the User Interface the workforce talent supply total by element changes to a smaller number, the pie chart goes from full at 100% to a partial <100% (2305), and in the bar graph, the bar that represents the element that was moved into the Must Have section changes color (2304).

The workforce talent population numbers for all elements moved into the Must Have section represents a Boolean AND join between each of the elements. For example, if three elements (1, 2, and 3) have been moved into the Must Have section, the resulting workforce talent population number means this many people can be expected to have element 1 AND element 2 AND element 3.

Another tab or section of the User Interface is named Market Demand (2207). In this section the User Interface displays the competitive demand for all the elements extracted from the job specification and for the same combination of elements the user moved to the Must Have section of the workspace. For comparison, the demand and supply totals are both shown. The supply and demand data is displayed as bar graphs (2401) with separate bars for each element and for the combination of elements the user moved into the Must Have section of the workspace. The demand bar represents the cumulative number of currently posted job specifications for the elements or combination of elements. There are also separate sets of graphs for up to 3 locations: local, state and national.

FIG. 24 shows additional aspects of the user interface. Item 2401 shows how workforce talent supply and demand totals are displayed. There is a separate workforce talent supply bar and demand bar for each element designated as a "must have" element. Item 2402 depicts how a user selects an available candidate to view the candidate's profile job elements. The bolded elements, elements 3 & 6 are "must have" elements. Elements 9,4 & 7, are elements that appear in the job specification and also in the candidate resume/profile, but were not designated as "must have" elements.

In the Market Demand section, when a user moves their mouse over a demand bar in one of the bar graphs, the interface displays the list of organizations with current competitive demand for all the elements and combination of elements the user moved into the Must Have section of the workspace.

The name of the competing organization is displayed as well as the current number of posted job specifications. Double clicking on an organization name displays a list of the job titles associated with that organization. Double clicking on a job title displays a copy of the actual job specification.

In another tab or section of the User Interface, named the What IF section, a user can model (2208) different combinations of elements, geographies and other factors to observe the impact on workforce talent supply and demand. This section provides an opportunity for a user to try different combinations of elements, geographies and factors to try and optimize the job specification for the maximum workforce talent supply.

As shown in 2209, another tab or section of the User Interface, named CareerView Profiles, loads and displays any candidates who match and have all of the Must Have elements the user has selected. The candidates may have additional elements that were on the master list for the job specification under analysis, but they must have all of the Must Have elements. Any matched candidates are displayed in a list. The list displays the candidate's job title and the date the candidate information is first displayed to the user. To display more candidate information the user double-clicks on the candidate's job title (2402). This action displays a list of all the elements extracted from the candidate's resume/profile (2210). Elements that also match the elements moved by the user into the Must Have section are color-coded for easy identification. The user also has an option at this point to display the complete candidate information. If the user wants to request an interview with a candidate (2211), a checkbox is provided.

The salient features of the candidates view of the User Interface is shown in elements 2304, 2305 and 25.

Element 2304 displays how the candidate user views the workforce talent supply for each of the job elements distilled from the candidates resume/profile. This is showing the candidate how many other people have the same job skills and experiences. This is essentially the same workforce talent supply information display that a recruiter user would see for the elements distilled from a job specification.

Element 2401 displays how the candidate user views the workforce talent demand, at a point in time, compared to workforce talent supply, for each of the job elements distilled from the candidates resume/profile. This is essentially the same workforce talent demand information display that a recruiter user would see for the elements distilled from a job specification.

Element 2501 displays how a candidate user reviews a job specification that has been matched by the invention to the candidate's job elements. Element 2502 is the candidates match ratio. This means the invention has found the candidate's job elements to match nine out of ten (90%) of the job Elements distilled from the job specification for the Product Engineering position at Thames Valley Engineering, Inc. The job elements designated as "must have" elements or requirements is shown in element 2503. To see the full job specification the candidate would click on the "show full description" link (2504) with his/her browser.

Element 2505 shows how a candidate user indicates an interest in a job opportunity and requests to be contacted by the recruiter user. The candidate user clicks on the "I'm interested contact now" link (2507) with his/her browser. There are 3 available conditions the candidate user can select from at this point. Element 2506 is a green colored indicator. This is where the candidate user requests that the recruiter user contact him/her. A yellow indicator is where the candidate user displays uncertainty about the job opportunity and requests further information from the recruiter user. Clicking on the "I may be interested. Tell me more" link provides the candidate user with an opportunity to compose a message for the recruiter user. The red indicator is where the candidate user notifies the recruiter user that he/she is not interested in the job opportunity. Clicking on the "I'm not interested. Here's why . . . " link provides the candidate user with the option to compose a message for the recruiter user, or to just notify the recruiter user that he/she is not interested in the opportunity.

Although this invention has been described with reference to particular embodiments involving external or non-employee candidates, the invention can also be used in exactly the same manner with internal candidates or employees.

Although the present invention has been described in terms of preferred embodiments, it is not intended that the invention be limited to these embodiments. Modifications within the scope of the invention will be apparent. The scope of the present invention is defined by the claims.

What is claimed is:

1. A method of processing candidate resumes and job specifications to match candidates with job specifications, comprising providing a database of elements, each element expressed in natural language and at least some of which are associated with a corresponding set of synonymous words or phrases, the elements and the synonymous words or phrases each having a corresponding usage counter;

a server receiving candidate resumes and job specifications in electronic form and expressed in natural language, such that candidates skills and experiences are expressed in words and phrases;

a server analyzing the natural language expression of the candidate resumes and job specifications to extract elements expressed in candidate resumes and job specifications;

a server comparing the extracted elements to the database and updating the usage counters corresponding to the extracted elements such that the relative frequency of the words or phrases expressing skills and experiences is tracked;

a server for each extracted element, determining which of the extracted element or the corresponding set of synonymous words or phrases has the highest usage and using the word, phrase or element with the highest usage as a common form for the extracted element and;

a server matching a set of candidate resumes with a corresponding job specification by comparing the set of elements expressed in common form for the candidate resumes with the set of elements expressed in common form for the job specification.

2. The method of claim 1 wherein the elements, words or phrases in the database are captured from processing candidate resumes and job specifications and as new words or phrases are identified during processing they are subjected to a validation technique and valid elements are added to the database to make it a learning database.

3. The method of claim 1 wherein the received candidate resumes are in disparate formats.

4. The method of claim 1 wherein the estimated workforce supply includes required elements from the job specification.

5. The method of claim 4, further comprising recommending required job elements to be removed from the job specification.

6. The method of claim 1 wherein the elements include products used, tools used, industries, education level attained, role or job title, willingness to travel, or security clearance.

* * * * *